(12) United States Patent
Zhuang et al.

(10) Patent No.: US 11,173,400 B2
(45) Date of Patent: Nov. 16, 2021

(54) DATA EXCHANGE METHOD AND APPARATUS, STORAGE MEDIUM AND ELECTRONIC DEVICE

(71) Applicant: TENCENT TECHNOLOGY (SHENZHEN) COMPANY LIMITED, Guangdong (CN)

(72) Inventors: Qi Jian Zhuang, Shenzhen (CN); Jian Tong Li, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 0 days.

(21) Appl. No.: 16/869,019

(22) Filed: May 7, 2020

(65) Prior Publication Data

US 2020/0261802 A1 Aug. 20, 2020

Related U.S. Application Data

(63) Continuation of application No. PCT/CN2019/071882, filed on Jan. 16, 2019.

(30) Foreign Application Priority Data

Jan. 16, 2018 (CN) .......................... 201810041015.0

(51) Int. Cl.
*A63F 13/58* (2014.01)
*A63F 13/35* (2014.01)
*H04L 29/06* (2006.01)

(52) U.S. Cl.
CPC .............. *A63F 13/58* (2014.09); *A63F 13/35* (2014.09); *H04L 67/38* (2013.01)

(58) Field of Classification Search
None
See application file for complete search history.

(56) References Cited

U.S. PATENT DOCUMENTS 10,768,689 B2* 9/2020 Kwak ..................... G06F 3/013
2003/0236111 A1 12/2003 Otani et al.
(Continued)

FOREIGN PATENT DOCUMENTS

| CN | 105457275 A | 4/2016 |
|---|---|---|
| CN | 106488789 A | 3/2017 |

(Continued)

OTHER PUBLICATIONS

International Search Report for PCT/CN2019/071882 dated Mar. 27, 2019 (PCT/ISA/210).

*Primary Examiner* — Ronald Laneau
(74) *Attorney, Agent, or Firm* — Sughrue Mion, PLLC

(57) ABSTRACT

A data exchange method includes: obtaining an operation instruction based on a control operation on a first virtual character; controlling, according to the operation instruction, the first virtual character to perform an interaction action on the first virtual object; and adjusting a state of the first virtual object to a first target state based on the interaction action performed on the first virtual object and adjusting a state of a second virtual object displayed in a second area of the display interface to a second target state in response to the state of the first virtual object being changed, a second virtual character displayed in the second area of the display interface being controlled by a second client to perform an interaction action on the second virtual object.

20 Claims, 8 Drawing Sheets

(56) References Cited

U.S. PATENT DOCUMENTS

| | | | |
|---|---|---|---|
| 2004/0224762 A1 | 11/2004 | Haga et al. | |
| 2013/0251204 A1* | 9/2013 | Pulsipher | G06K 9/00369 |
| | | | 382/103 |
| 2016/0051897 A1* | 2/2016 | McBride | A63F 9/24 |
| | | | 463/31 |
| 2020/0265234 A1* | 8/2020 | Lee | H04N 5/23219 |
| 2021/0106914 A1* | 4/2021 | Fan | A63F 13/573 |

FOREIGN PATENT DOCUMENTS

| | | |
|---|---|---|
| CN | 106492457 A | 3/2017 |
| CN | 108187343 A | 6/2018 |

* cited by examiner

DATA EXCHANGE METHOD AND APPARATUS, STORAGE MEDIUM AND ELECTRONIC DEVICE

CROSS-REFERENCE TO RELATED APPLICATION(S)

This application is a bypass continuation application of International Application No. PCT/CN2019/071882, filed with the Chinese Patent Office on Jan. 16, 2019, which claims priority to Chinese Patent Application No. 201810041015.0, filed with the Chinese Patent Office on Jan. 16, 2018 and entitled "DATA EXCHANGE METHOD AND APPARATUS, STORAGE MEDIUM AND ELECTRONIC DEVICE", the disclosures of which are herein incorporated by reference in their entireties.

FIELD

The example embodiments of the disclosure relate to the field of computers, and specifically, to a method and an apparatus for data exchange, a storage medium and an electronic device therefor.

BACKGROUND

Currently, in many terminal applications, virtual characters controlled by using different clients are normally all displayed in a scene provided by the terminal application, and different virtual characters are controlled to perform action interaction in the scene, to complete a virtual task preset in the scene.

However, in a client of the terminal application, a manner provided in the related art for data exchange between different virtual characters is relatively undiversified, which causes a problem of a relatively poor interaction effect.

For the foregoing problem, no effective solution has been provided.

SUMMARY

One or more example embodiments of the disclosure provide a method and an apparatus for data exchange, a storage medium and an electronic device, to solve at least a technical problem of a relatively poor interaction effect caused by a relatively undiversified data exchange manner provided in the related art.

According to an aspect of an example embodiment of the disclosure, a data exchange method is provided, including: obtaining, by a first client, an operation instruction based on a control operation on a first virtual character controlled by the first client, a first group including the first virtual character and a first virtual object displayed in a first area of a display interface of the first client; controlling, by the first client according to the operation instruction, the first virtual character to perform an interaction action on the first virtual object displayed in the first area; and adjusting, by the first client, a state of the first virtual object in the first area to a first target state based on the interaction action performed on the first virtual object and adjusting a state of a second virtual object displayed in a second area of the display interface to a second target state in response to the state of the first virtual object being changed based on the interaction action performed on the first virtual object, a second group including the second virtual object and a second virtual character displayed in the second area to oppose the first group, and the second virtual character being controlled by a second client to perform an interaction action on the second virtual object.

According to an aspect of an example embodiment of the disclosure, a data exchange apparatus is further provided, applied to a first client, the apparatus including: at least one memory configured to store program code; and at least one processor configured to read the program code and operate as instructed by the program code, the program code including: obtaining code configured to cause at least one of the at least one processor to obtain an operation instruction generated based on a control operation on a first virtual character controlled by the first client, a first group including the first virtual character and a first virtual object displayed in a first area of a display interface of the first client; execution code configured to cause at least one of the at least one processor to control, according to the operation instruction, the first virtual character to perform an interaction action on the first virtual object displayed in the first area; and adjustment code configured to cause at least one of the at least one processor to adjust a state of the first virtual object in the first area to a first target state based on the interaction action performed on the first virtual object and adjusting a state of a second virtual object displayed in a second area of the display interface to a second target state in response to the state of the first virtual object being changed based on the interaction action performed on the first virtual object, a second group including the second virtual object and a second virtual character displayed in the second area to oppose the first group, and the second virtual character being controlled by a second client to perform an interaction action on the second virtual object.

According to an aspect of an example embodiment of the disclosure, a non-transitory storage medium is further provided, storing a program executable by at least one processor, the program including: obtaining code configured to cause at least one of the at least one processor to obtain an operation instruction generated based on a control operation on a first virtual character controlled by a first client, a first group including the first virtual character and a first virtual object displayed in a first area of a display interface of the first client; execution code configured to cause at least one of the at least one processor to control, according to the operation instruction, the first virtual character to perform an interaction action on the first virtual object displayed in the first area; and adjustment code configured to cause at least one of the at least one processor to adjust a state of the first virtual object in the first area to a first target state based on the interaction action performed on the first virtual object and adjusting a state of a second virtual object displayed in a second area of the display interface to a second target state in response to the state of the first virtual object being changed based on the interaction action performed on the first virtual object, a second group including the second virtual object and a second virtual character displayed in the second area to oppose the first group, and the second virtual character being controlled by a second client to perform an interaction action on the second virtual object.

According to an aspect of an example embodiment of the disclosure, an electronic device is further provided, including a memory, a processor, and a computer program stored in the memory and executable by the processor, the processor performing the foregoing data exchange method by using the computer program.

According to example embodiments of the disclosure, the first group including the first virtual character is displayed in the first area of the display interface of the first client, and in the case that the state of the first virtual object changes after the first client receives the interaction action performed by the first virtual character on the first virtual object in the first area, the state of the first virtual object in the first area is adjusted to the first target state, and the state of the second virtual object in the second area in the display interface is adjusted to the second target state, the second area being used for displaying the second group opposing the first group, and the second virtual character included in the second group performing the interaction action on the second virtual object by using the second client. In this manner, interaction manners between different virtual characters are enriched, and an interaction effect is improved, thereby solving technical problems that only a relatively poor quality interaction effect is achieved by a relatively undiversified data exchange manner provided in the related art.

BRIEF DESCRIPTION OF THE DRAWINGS

The accompanying drawings described herein are used for providing further understanding of the disclosure and constitute a part of the disclosure. Example embodiments of the disclosure and descriptions thereof are used for explaining the disclosure and do not constitute an improper limitation to the disclosure.

DETAILED DESCRIPTION

To make a person skilled in the art better understand solutions of the disclosure, the following clearly and completely describes the technical solutions in the embodiments of the disclosure with reference to the accompanying drawings in the embodiments of the disclosure. Apparently, the described embodiments are merely some rather than all of the embodiments of the disclosure. All other embodiments obtained by a person skilled in the art based on the embodiments of the present application without creative efforts shall fall within the protection scope of the present application.

In the specification, claims, and accompanying drawings of the disclosure, the terms "first", "second", and so on are intended to distinguish between similar objects rather than indicating a specific order. The data termed in such a way are interchangeable in proper circumstances, so that the embodiments of the disclosure described herein may be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

Figure 1:
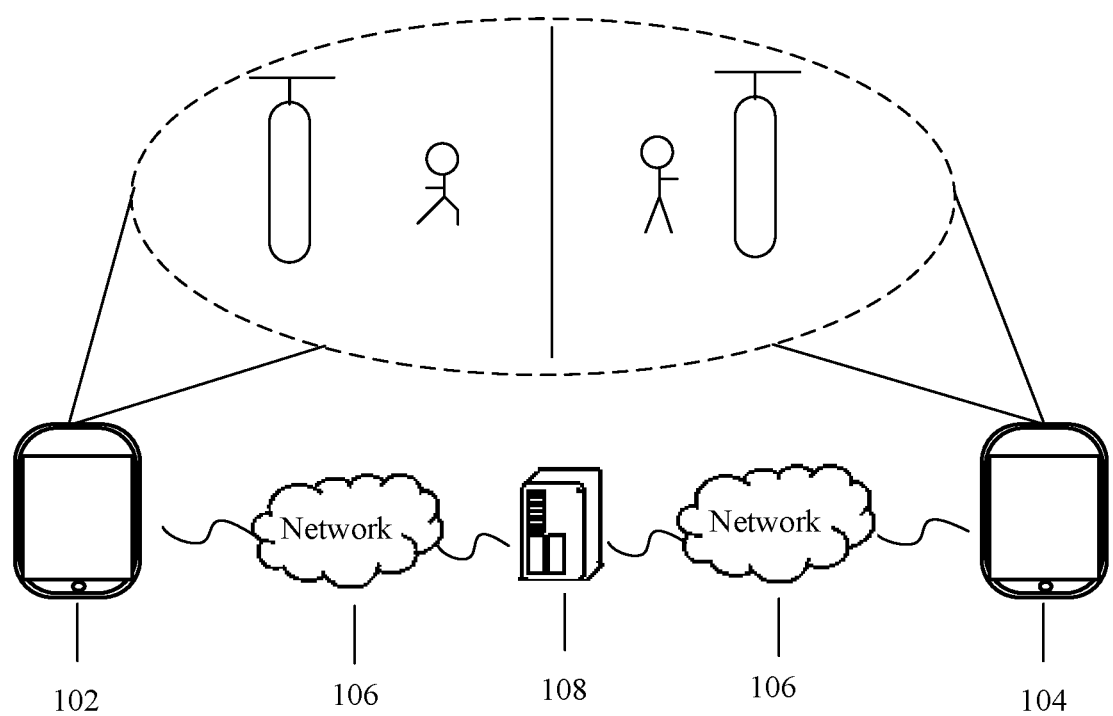
FIG. 1 is a schematic diagram of an application environment of an optional data exchange method according to an example embodiment.

FIG. 1 is a schematic diagram of an application environment of an optional data exchange method according to an example embodiment.

According to an aspect of example embodiments of the disclosure, a data exchange method is provided. Optionally, the data exchange method may be applied, but not limited, to an environment shown in FIG. 1. Herein, a "first area" refers to an area on a left side with respect to a vertical line in the figure, and a first virtual character and a first virtual object are displayed in the first area. A "second area" refers to an area on a right side with respect to the vertical line in the figure, and a second virtual character and a second virtual object are displayed in the second area. The method includes: obtaining an operation instruction generated by performing a control operation on the first virtual character controlled by a first client 102, a first group including the first virtual character being displayed in the first area of a display interface of the first client; controlling, according to the operation instruction, the first virtual character to perform an interaction action on the first virtual object displayed in the first area; and adjusting a state of the first virtual object in the first area to a first target state and adjusting a state of the second virtual object displayed in the second area of the display interface to a second target state in a case that the state of the first virtual object changes after the interaction action is performed, the second area being used for displaying a second group opposing the first group, and the second virtual character included in the second group performing an interaction action on the second virtual object by using the second client 104. The first client 102 and the second client 104 perform data exchange with each other through a network 106 and a server 108.

Optionally, in an example embodiment, the first client 102 and the second client 104 may each include, but are not limited to, a client that is run on a terminal, for example, a game client. The terminal may include, but is not limited to, at least one of the following: a mobile phone, a tablet computer, a notebook computer, and another mobile hardware device for controlling intelligent hardware. The network may include, but is not limited to, a wireless network. The wireless network includes: Bluetooth, WI-FI, and another network implementing wireless communication. The server may include, but is not limited to, at least one of the following: a notebook computer, a personal computer (PC), and any other device for a computing service. The foregoing is merely an example, and an example embodiment is not limited thereto.

Optionally, the first client 102 and the second client 104 may perform data exchange with each other directly through, but not limited to, a network.

Figure 2:
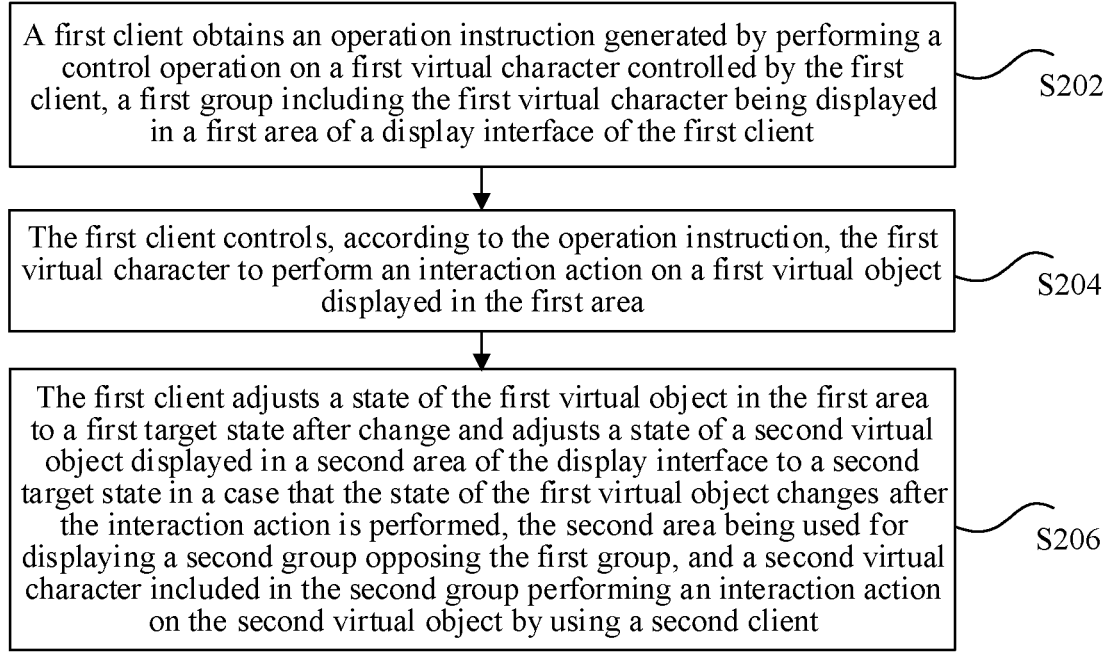
FIG. 2 is a schematic flowchart of an optional data exchange method according to an example embodiment.

FIG. 2 is a schematic flowchart of an optional data exchange method according to an example embodiment.

Optionally, as shown in FIG. 2, the data exchange method includes the following operations:

S202: A first client obtains an operation instruction generated by performing a control operation on a first virtual character controlled by the first client, a first group including the first virtual character being displayed in a first area of a display interface of the first client.

S204: The first client controls, according to the operation instruction, the first virtual character to perform an interaction action on a first virtual object displayed in the first area.

S206: The first client adjusts a state of the first virtual object in the first area to a first target state after the interaction action is performed and adjusts a state of a second virtual object displayed in a second area of the display interface to a second target state in a case that the state of the first virtual object changes after the interaction action is performed, the second area being used for displaying a second group opposing the first group, and a second virtual character included in the second group performing an interaction action on the second virtual object by using a second client.

Optionally, the data exchange method may be applied, but not limited, to a game field. The first virtual character and the second virtual character may each be a controlled virtual person or the like in the game field. The first virtual object and the second virtual object may each be a virtual object interacting with the first virtual person or the second virtual person. The interaction action may be an action for changing a state of the virtual object.

For example, in a game application, there is a first area and a second area. One virtual person and one or more virtual objects are displayed in each of the first area and the second area. After the first client obtains an operation instruction generated by performing a control operation on the virtual person in the first area, the first client controls the virtual person in the first area to perform an interaction action on the virtual object in the first area, to change a state of the virtual object in the first area. After the state of the virtual object in the first area changes, the state of the virtual object in the first area is adjusted to a first target state, and a state of the virtual object in the second area is adjusted to a second target state.

The game field may be a multiplayer online battle arena (MOBA) game or a single-player game (SPG), which is not specifically limited herein. The game application may include, but is not limited to, at least one of the following: a two dimensional (2D) game application, a three dimensional (3D) game application, a virtual reality (VR) game application, an augmented reality (AR) game application, and a mixed reality (MR) game application. The foregoing is merely an example, and this embodiment is not limited thereto.

Figure 3:
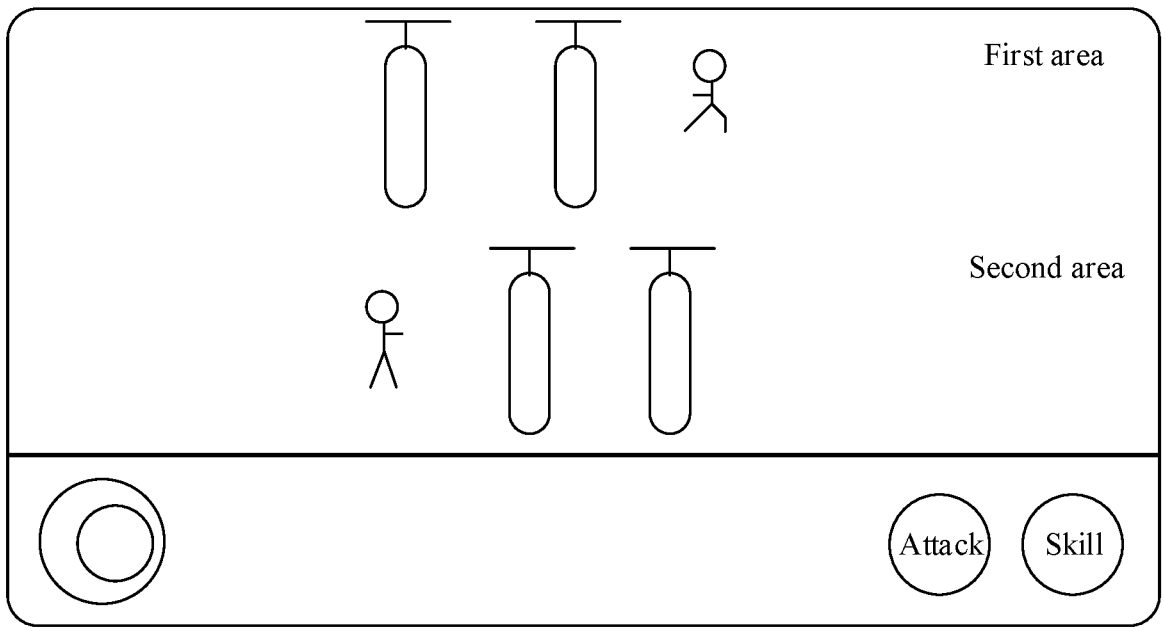
FIG. 3 is a schematic diagram of an optional data exchange method according to an example embodiment.

FIG. 3 is a schematic diagram of an optional data exchange method according to an example embodiment.

Referring to FIG. 3, virtual persons as virtual characters, and sandbags as virtual objects are displayed. Three operation keys on a client are shown in the bottom portion of FIG. 3. For example, a key on a left side is a key for controlling a virtual person in the figure to move, and keys on a right side are respectively a key for controlling the virtual person to launch an attack and a key for controlling the virtual person to release a skill. When the client receives an operation instruction for instructing the virtual person in a first area to attack a sandbag, the client may control, according to the operation instruction, the virtual person in the first area to attack the sandbag. After the attack against the sandbag is performed in the first area, the state of the sandbag in the first area is adjusted to a first target state, and a state of the sandbag in a second area is adjusted to a second target state.

Optionally, in an example embodiment, the first group including the first virtual character and the second group including the second virtual character may each include, but are not limited to, a plurality of virtual characters. For example, the first virtual character and the second virtual character may be virtual persons. Descriptions are provided in the following with reference to FIG. 3. A virtual person belonging to a first group is present in a first area in FIG. 3; and a virtual person belonging to a second group is present in a second area. Alternatively, two, three, or more virtual persons belonging to the first group may be set in the first area; and two, three, or more virtual persons belonging to the second group may be set in the second area. Quantities of virtual persons in the first group and the second group and quantities of virtual objects are not specifically limited in this embodiment.

Optionally, the first area and the second area in this embodiment are two areas that do not overlap, and are not limited to positions shown in FIG. 3. For example, the first area may be located above the second area. Specific positions of the two areas are not specifically limited herein.

Optionally, the performed interaction action may be attacking the virtual object, moving the virtual object, adding an element to or removing an element from the virtual object, interacting with the virtual object, or any other interaction action capable of changing the state of the virtual object.

Optionally, in this embodiment, the first target state and the second target state may be, but are not limited to, different states, for example, states with opposite trends. For example, the first target state may be a state of being a small size (hereinafter "small state"), a state of being transparent or invisible (hereinafter "transparent state"), or the like, and the second target state may be a state of being a large size (hereinafter "large state"), a state of being displayed or visible (hereinafter "displayed state"), or the like. The first target state may be a state with a decreased quantity (hereinafter "decreased quantity state"), and the second target state may be a state with an increased quantity (hereinafter "increased quantity state"). For example, when the first target state is a small state, the second target state is a large state; when the first target state is a transparent state, the second target state may be a displayed state. When the first target state is a decreased quantity state, the second target state is an increased quantity state.

The small, large, transparent, displayed, decreased quantity, increased quantity, and other states are only given as examples, and are not specifically limited in this embodiment.

Optionally, the adjusting, by the first client, a state of the first virtual object in the first area to a first target state after the interaction action is performed and adjusting a state of a second virtual object displayed in a second area of the display interface to a second target state in a case that the state of the first virtual object changes after the interaction action is performed includes: S1: The first client adjusts the state of the first virtual object in the first area to the first target state corresponding to a negative change to the first virtual object (e.g., decrease in quantity, size, or visibility) and adjusts the state of the second virtual object in the second area to the second target state corresponding to a positive change to the second virtual object (e.g., increase in quantity, size, or visibility) in the case that the state of the first virtual object changes after the interaction action is performed.

Optionally, the negative change may be changing from the second target state to the first target state, and the positive change may be changing from the first target state to the second target state. For example, the first target state may be small, disappeared, or the like, and the second target state may be large, appeared, or the like. In this case, the changing from the second target state to the first target state may be changing from the large state to the small state, or from the visible or displayed state to the invisible or transparent state; and the changing from the first target state to the second target state may be changing from the small state to the large state, or from the invisible or transparent state to the visible or displayed state.

The foregoing are merely an example. In this embodiment of the disclosure, the small state is not limited to correspond to the large state. Alternatively, the first target state is large, and the second target state is small, which is not specifically limited in this embodiment.

Optionally, the controlling, by the first client according to the operation instruction, the first virtual character to perform an interaction action on a first virtual object displayed in the first area may include: after receiving an operation instruction on the first client, controlling, by the first client according to the operation instruction, the first virtual character in the first area to perform the interaction action on the first virtual object in the first area, and sending a parameter corresponding to the interaction action to a server. For example, after the first virtual character attacks the first virtual object, parameters such as an attack value of the first virtual character and whether a skill is used are sent to the server. The server receives the parameter sent by the first client and a parameter sent by the second client. After receiving the parameter sent by the first client and the parameter sent by the second client, the server calculates according to the parameters, for example, calculating according to the attack value of the first virtual character, whether the skill is used, and the like to determine whether and how much the state of the first virtual object is to be changed; and calculating according to attributes such as an action and an attack value of the second virtual character to determine whether and how much the state of the second virtual object is to be changed, and sends a calculation result to the first client and the second client. After receiving the calculation result, the first client adjusts the states of the first virtual character and the first virtual object on the first client according to the calculation result. For example, if the server calculates and obtains that the state of the first virtual object is changed after the first virtual character attacks the first virtual object, for example, a quantity of first virtual objects is reduced from five to four, the server sends the state of the first virtual object to the first client, and the first client displays a changed quantity of first virtual objects. In addition, the server sends the calculation result to the second client, so that the second client adjusts the displayed second virtual object according to the calculation result.

Optionally, before the obtaining, by a first client, an operation instruction generated by performing a control operation on a first virtual character controlled by the first client, the method further includes: S1: The first client displays the first virtual character and the first virtual object in the first area according to a character coordinate address that is located in the first area and that is assigned to the first virtual character in the first group and an object coordinate address that is located in the first area and that is assigned to the first virtual object. S2: The first client displays the second virtual character and the second virtual object in the second area according to a character coordinate address that is located in the second area and that is assigned to the second virtual character in the second group and an object coordinate address that is located in the second area and that is assigned to the second virtual object. The second virtual object and the first virtual character may possess the same group tag, and the first virtual object and the second virtual character may possess the same group tag.

Optionally, the second virtual object and the first virtual character belong to the same camp, and the first virtual object and the second virtual character belong to the same camp.

For example, after the first virtual object is displayed after refresh in the first area, the first virtual character in the first area may attack the first virtual object in the first area, and after the second virtual object is displayed after refresh in the second area, the second virtual character in the second area may attack the second virtual object in the second area. The first virtual object in the first area and the second virtual object in the second area may be set to belong to different camps and carrying different camp identifiers. For example, the first virtual object belongs to a camp A, and the second virtual object belongs to a camp B, camp identifiers of the two camps being different. The first virtual character belongs to the camp B. The first virtual character cannot attack the second virtual object in the camp B, and can attack only the first virtual object in the camp A. The second virtual character belongs to the camp A. The second virtual character can attack only the second virtual object in the camp B.

Optionally, the data exchange method further includes: disabling, by the first client, an interaction channel between the first virtual character and the second virtual character before the operation instruction generated by performing the control operation on the first virtual character controlled by the first client is obtained; and retaining a state of the second virtual character unchanged in a case that the first virtual character performs the interaction action on the first virtual object and the second virtual character is within an action coverage range of the interaction action (that is, retaining a state of the second virtual character unchanged regardless of whether the second virtual character is within an action coverage range of the interaction action performed by the first virtual character on the first virtual object), in a process of controlling, according to the operation instruction, the first virtual character to perform the interaction action on the first virtual object displayed in the first area.

For example, if a skill used when the first virtual character attacks the first virtual object covers the first virtual object, the first virtual object is attacked, and the state of the first virtual object may be changed. However, because the interaction channel between the first virtual character and the second virtual character is disabled, the first virtual character cannot attack the second virtual character. In addition, because the first virtual character and the second virtual object belong to the same camp, the first virtual character cannot attack the second virtual object. For example, the first area and the second area are set to areas that do not overlap. A first birth point is set in the first area, and the first virtual character is generated at the first birth point. A second birth point is set in the second area, and the second virtual character is generated at the second birth point. The first virtual character is allowed to move only in the first area, and the second virtual character is allowed to move only in the second area.

Although the first virtual character and the second virtual character are isolated in position, because skills are not isolated, an attack or a skill released by the first virtual character may reach the second virtual character or the second virtual object in the second area, and changes the state of the second virtual character or the second virtual object. Therefore, to prevent the state of the second virtual character or the second virtual object in the second area from being changed by the attack of the first virtual character in the first area, or to prevent the state of the first virtual character or the first virtual object in the first area from being changed by an attack of the second virtual character in the second area, BUFF (which is generally a gain effect or a special effect in a game) is configured for the first virtual character born in the first area and the second virtual character born in the second area. With the BUFF configured, even if an attack by the first virtual character reaches the second virtual character and the second virtual object in the second area, the states of the second virtual character and the second virtual object are unchanged, and even if an attack by the second virtual character in the second area reaches the first virtual character and the first virtual object in the first area, the states of the first virtual character and the first virtual object are unchanged. For example, an invisible monster, building, character, or the like is respectively generated in each of the first area and the second area, to add the BUFF to the first virtual character and the second virtual character to the effect that the states of the first virtual character and the second virtual character are unchanged even if a skill or an attack is applied by the second virtual character or the first virtual character.

Optionally, when the first client obtains an operation instruction generated by performing the control operation on the first virtual character controlled by the first client, the first client sends a parameter in the operation instruction to the server, and the server completes interaction between the first virtual character and the second virtual character. For example, after the server receives parameters that are uploaded by the first client and the second client and are respectively included in operation instructions for controlling the first virtual character and the second virtual character, when determining that the first virtual character is within an attack range of the second virtual character or the second virtual character is within an attack range of the first virtual character, the server returns a parameter for retaining the state of the first virtual character or the state of the second virtual character unchanged so that the state of the first virtual character or the state of the second virtual character is unchanged even if an attack is made by the second virtual character or the first virtual character.

Specifically, descriptions are provided with reference to FIG. 3. The first virtual character and the second virtual character may be virtual persons, the first virtual object and the second virtual object may be sandbags, and the interaction action may be an attack. When attacking a sandbag, the virtual person in the first area may attack the virtual person in the second area. Therefore, after receiving an attack parameter, which is sent by the client, of the virtual person in the first area, the server determines whether the attack parameter indicates that the virtual person in the second area can be reached by the attack. If the virtual person in the second area can be reachable by the attack, the server returns a parameter for retaining the state of the virtual person in the second area unchanged. Similarly, if the virtual person in the second area can attack the virtual person in the first area when attacking a sandbag, the server returns a parameter for retaining the state of the virtual person in the first area unchanged. In this way, the virtual person in the first area and the virtual person in the second area are prevented from attacking each other.

Optionally, an attacked state may be preset for the first virtual character and the second virtual character. When the first virtual character and the second virtual character are attacked, a corresponding attacked state, for example, being knocked down or stunned, is displayed.

Optionally, in a process of the controlling, by the first client according to the operation instruction, the first virtual character to perform an interaction action on a first virtual object displayed in the first area, the method further includes: S1: The first client adjusts the state of the first virtual object displayed in the first area and the state of the second virtual object displayed in the second area at an interval of a preset time period.

For example, when controlling, according to the operation instruction, the first virtual character to perform the interaction action on the first virtual object displayed in the first area, the first client sends interaction data such as the attack value of the first virtual character and a virtual health point of the first virtual character to the server, and the server obtains a calculation result after calculating according to the data uploaded by the first client and the second client. For example, if the calculation result indicates that the quantity of first virtual objects is decreased by one, and the quantity of the second virtual object is increased by one, the server returns the result to the first client, and the first client decreases the quantity of first virtual objects in the display interface by one, and increases the quantity of the second virtual object by one according to the result.

Optionally, an additional condition may further be preset. When the additional condition is satisfied, the states of the first virtual object and the second virtual object are adjusted.

Optionally, the additional condition may be time, a quantity of virtual objects, a quantity of virtual characters, or the like.

Optionally, before the obtaining, by a first client, an operation instruction generated by performing a control operation on a first virtual character controlled by the first client, the method further includes: S1: The first client assigns, in a virtual character movement layer, a first movement range matching the first area to the first virtual character, and a second movement range matching the second area to the second virtual character, the first movement range and the second movement range being isolated from each other.

Optionally, the virtual character movement layer may be divided into two equal or unequal parts, one part corresponding to the first area, and the other part corresponding to the second area. Alternatively, the virtual character movement layer is divided into a plurality of parts. Any one of the parts may correspond to the first area, and any of other parts other than the first area may correspond to the second area. The first area may be on a left side, a right side, an upper side, a lower side, or another position of the second area, which is not specifically limited herein. The second area may disposed opposite to the first area and not overlap with the first area. The second area is not specifically limited to a certain position.

Optionally, the expression "being isolated from each other" may mean that the areas do not communicate with each other, and the virtual characters cannot move from one area to another area.

Optionally, scores may be set for the first virtual character and the second virtual character. After the first virtual character performs the interaction action on the first virtual object in the first area, the score of the first virtual character may be changed; or after the second virtual character performs the interaction action on the second virtual object in the second area, the score of the second virtual character may be changed. Using a game application as an example, the first virtual character and the second virtual character may be virtual persons, the first virtual object and the second virtual object may be virtual enemies, and the interaction action may be an attack. A score is set for each virtual person. When the virtual person in the first area attacks an enemy in the first area, the score of the virtual person in the first area may be correspondingly increased. When the virtual person in the second area attacks an enemy in the second area, the score of the virtual person in the second area may be correspondingly increased. For example, the virtual person in the first area attacks and kills an enemy, the score is correspondingly increased by 100, and when the score of the virtual person gets a score 1000, the virtual person wins the game.

That the score is correspondingly increased by 100 and the virtual person wins the game when getting 1000 are only examples, and do not constitute a limitation to the disclosure. For example, when the virtual person in the first area attacks enemies in the first area, once the virtual person kills one enemy, the score is correspondingly increased by 100, while 100 or another value is subtracted from the score of the virtual person in the second area. When the virtual person in the second area kills one enemy, the score is correspondingly increased by 100, while 100 or another value is subtracted from the score of the virtual person in the first area, so that the virtual person in the first area competes with the virtual person in the second area. Alternatively, when the virtual person in the first area kills one enemy, one enemy is correspondingly generated in the second area, the enemy generated in the second area belonging to the same camp as the virtual person in the first area. After the virtual person in the second area kills one enemy, one enemy is correspondingly generated in the first area, the enemy generated in the first area belonging to the same camp as the virtual person in the second area. In addition, a score may also be set for each virtual object in the first area and the second area. After the first virtual character in the first area performs the interaction action on the first virtual object in the first area, the score corresponding to the first virtual object is assigned to the first virtual character in the first area. After the second virtual character in the second area performs the interaction action on the second virtual object in the second area, the score corresponding to the second virtual object is assigned to the second virtual character in the second area.

According to an example embodiment of the disclosure, the first client obtains the operation instruction generated by performing the control operation on the first virtual character controlled by the first client, controls, according to the operation instruction, the first virtual character to perform the interaction action on the first virtual object displayed in the first area, and adjusts the state of the first virtual object in the first area to a first target state after performing the interaction action on the first virtual object and adjusts the state of the second virtual object displayed in the second area of the display interface to a second target state in the case that the state of the first virtual object changes after the interaction action is performed on the first virtual object. In this way, interaction manners between different virtual objects are enriched, and interaction experience is improved.

As an optional implementation, the adjusting, by the first client, a state of the first virtual object in the first area to a first target state after performing the interaction action on the first virtual object and adjusting a state of a second virtual object displayed in a second area of the display interface to a second target state in a case that the state of the first virtual object changes after the interaction action is performed on the first virtual object includes:

S1: The first client adjusts the state of the first virtual object in the first area to the first target state corresponding to a negative change and adjusts the state of the second virtual object in the second area to the second target state corresponding to a positive change in the case that the state of the first virtual object changes after the interaction action is performed on the first virtual object.

The adjusting, by the first client, the state of the first virtual object in the first area to the first target state corresponding to a negative change and adjusting the state of the second virtual object in the second area to the second target state corresponding to a positive change in the case that the state of the first virtual object changes after the interaction action is performed includes at least one of the following:

(1) deleting, by the first client, the first virtual object from the first area and displaying a newly added second virtual object in the second area in a case that the first virtual object satisfies a disappearance condition after the interaction action is performed on the first virtual object; and (2) adjusting, by the first client, a virtual resource value of the first virtual object in the first area to decrease to a first target value and adjusting a virtual resource value of the second virtual object in the second area to increase to a second target value in a case that the virtual resource value of the first virtual object decreases after the interaction action is performed on the first virtual object.

The game field is still used as an example, but this is only for illustrative purposes only and the disclosure is not disclosed thereto. As shown in FIG. 3, when a round of a game of hitting sandbags is played, there are two sandbags in each of the first area and the second area. When a sandbag in the first area is smashed by the first virtual character, the smashed sandbag in the first area slowly disappears.

Figure 4:
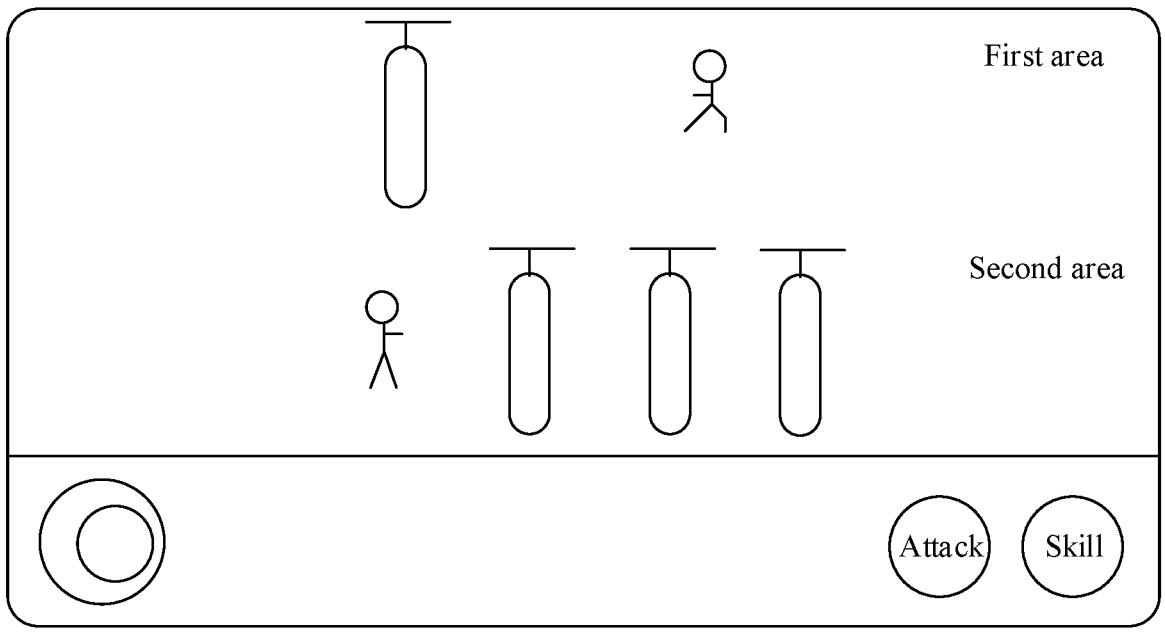
FIG. 4 is a schematic diagram of another optional data exchange method according to an example embodiment.

FIG. 4 is a schematic diagram of another optional data exchange method according to an example embodiment. As shown in FIG. 4, the two sandbags in the first area of FIG. 3 change to one sandbag. Because one of the sandbags in the first area is smashed and disappears, a new sandbag is generated in the second area, and the two sandbags in the second area of FIG. 3 change to three sandbags.

Figure 5:
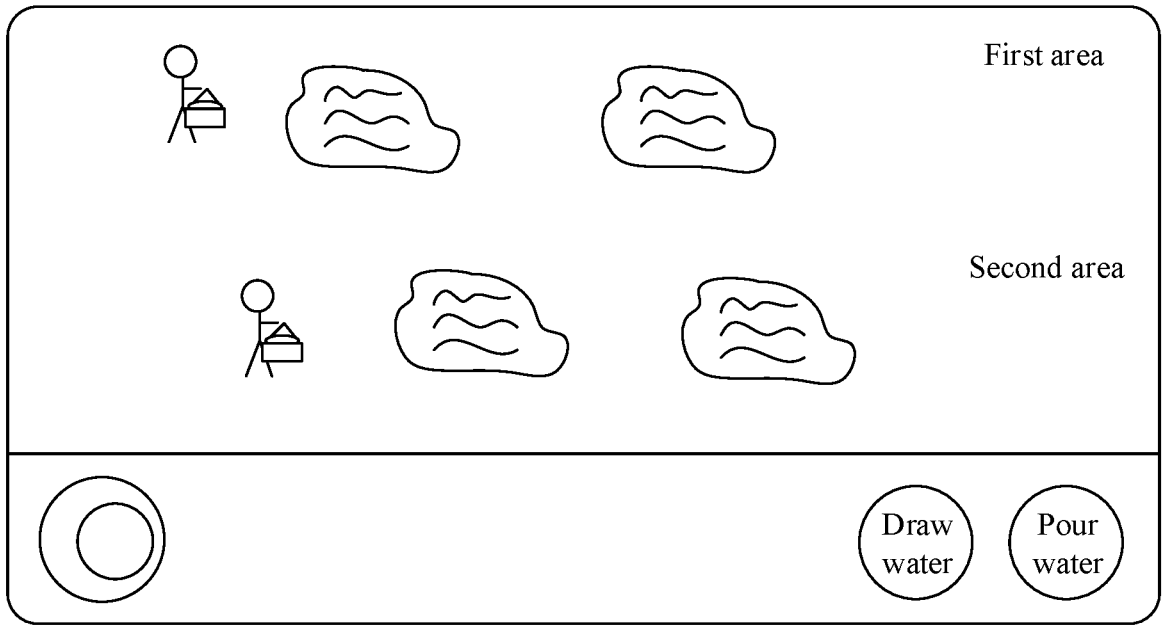
FIG. 5 is a schematic diagram of still another optional data exchange method according to an example embodiment.
Figure 6:
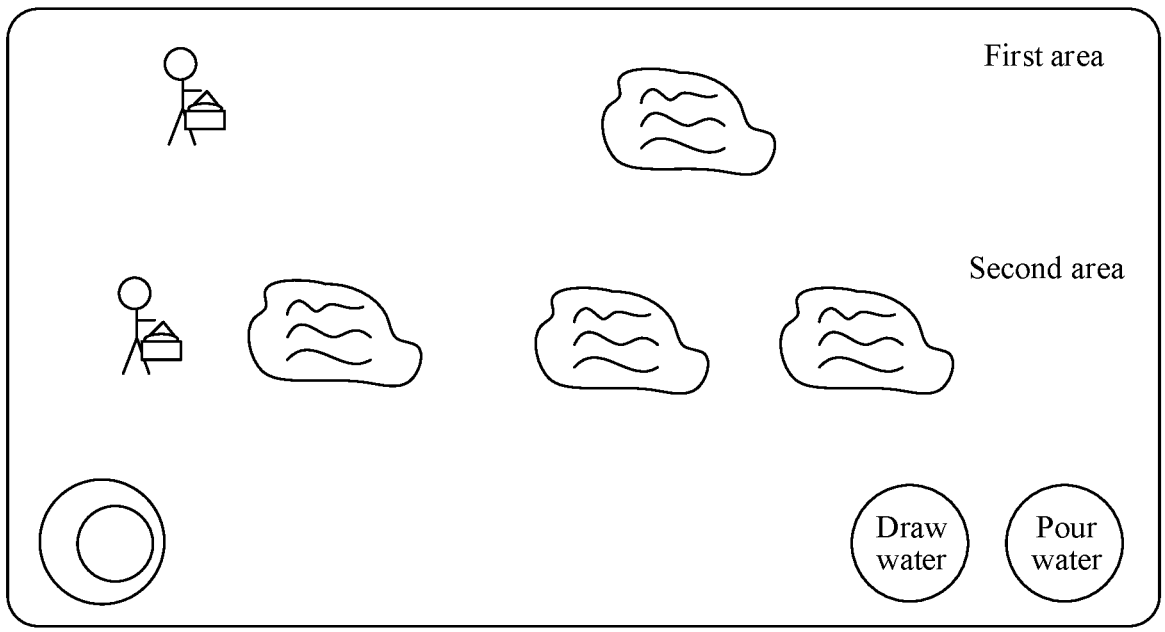
FIG. 6 is a schematic diagram of still another optional data exchange method according to an example embodiment.

FIGS. 5 and 6 are schematic diagrams of still other optional data exchange methods according to example embodiments.

FIG. 5 and FIG. 6 show alternative other optional game interactions of drawing water. As shown in FIG. 5, there are two pools in each of the first area and the second area in FIG. 5. Game characters use buckets to draw water. After the first virtual character draws all of water in a first pool of the two pools in the first area by using the bucket, the first pool disappears. After a character in the first area draws all of water in the first pool in the first area of FIG. 5, the first pool disappears, and a second pool of the two pools is left as shown in FIG. 6. Because the virtual character in the first area draws all of the water in the first pool, a new pool is added in the second area as shown in FIG. 6.

According to an example embodiment of the disclosure, the first client changes the states of the first virtual object and the second virtual object according to the interaction actions of the first virtual character and the second virtual character. In this way, interaction manners between different virtual objects are enriched, and interaction experience is improved.

As an optional implementation, before the obtaining, by a first client, an operation instruction generated by performing a control operation on a first virtual character controlled by the first client, the method further includes:

S1: The first client displays the first virtual character and the first virtual object in the first area according to a character coordinate address that is located in the first area and that is assigned to the first virtual character in the first group and an object coordinate address that is located in the first area and that is assigned to the first virtual object.

S2: The first client displays the second virtual character and the second virtual object in the second area according to a character coordinate address that is located in the second area and that is assigned to the second virtual character in the second group and an object coordinate address that is located in the second area and that is assigned to the second virtual object.

The second virtual object and the first virtual character possess the same group tag, and the first virtual object and the second virtual character possess the same group tag.

Figure 7:
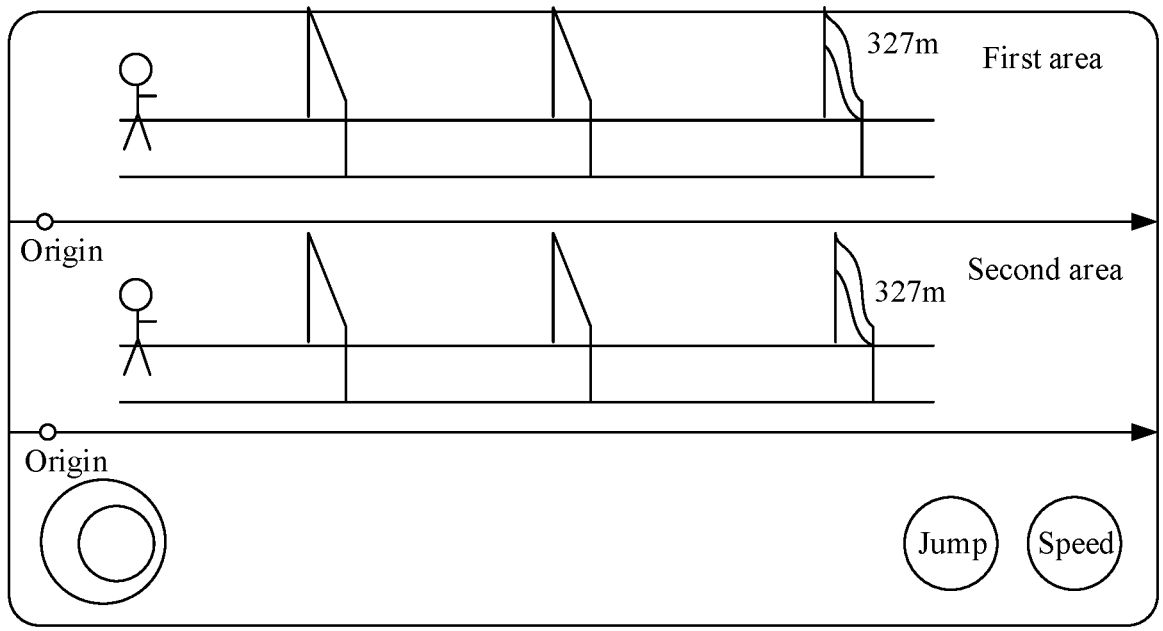
FIG. 7 is a schematic diagram of still another optional data exchange method according to an example embodiment.

FIG. 7 is a schematic diagram of still another optional data exchange method according to an example embodiment. FIG. 7 shows an interface of a racing game as an example. There are a plurality of barriers in each of the first area and the second area that need to be hurdled by a virtual character. A one-dimensional coordinate system is established by using an initial triggering position of the virtual character as an origin and using a direction along which the virtual character runs as a positive direction. The origin is used as a place where the virtual character is generated, and the barriers are generated at an interval. The first client operates the first virtual character in the first area to hurdle the barriers and rush to an endpoint, a distance between the first virtual character and the endpoint being indicated as 327 meters. The second client controls the second virtual character in the second area to hurdle the barriers and rush to an endpoint, a distance between the second virtual character and the endpoint being indicated as 327 meters. Once the first virtual character in the first area hurdles one barrier, a new barrier is generated in a track of the second area, to obstruct the second virtual character. Once the second virtual character hurdles one barrier, a new barrier is generated in a track of the first area, to obstruct the first virtual character.

The barriers in the first area belong to the same camp as the second virtual character, and the barriers in the second area belong to the same camp as the first virtual character.

According to an example embodiment of the disclosure, the first client displays the first virtual character, the first virtual object, the second virtual character and the second virtual object by using coordinates, so that generation positions of the virtual objects and the virtual characters may be fixed, thereby preventing a problem that the generation positions of the virtual objects and the virtual characters are inappropriate. Accordingly, Interaction experience between the characters is improved.

As an optional implementation, the data exchange method further includes:

S1: The first client disables an interaction channel between the first virtual character and the second virtual character before the operation instruction generated by performing the control operation on the first virtual character controlled by the first client is obtained.

S2: The first client retains a state of the second virtual character unchanged in a case that the first virtual character performs the interaction action on the first virtual object and the second virtual character is within an action coverage range of the interaction action (that is, the state of the second virtual character is retained unchanged regardless of whether the second virtual character is within an action coverage range of the interaction action performed by the first virtual character on the first virtual object), in a process of controlling, according to the operation instruction, the first virtual character to perform the interaction action on the first virtual object displayed in the first area.

Figure 8:
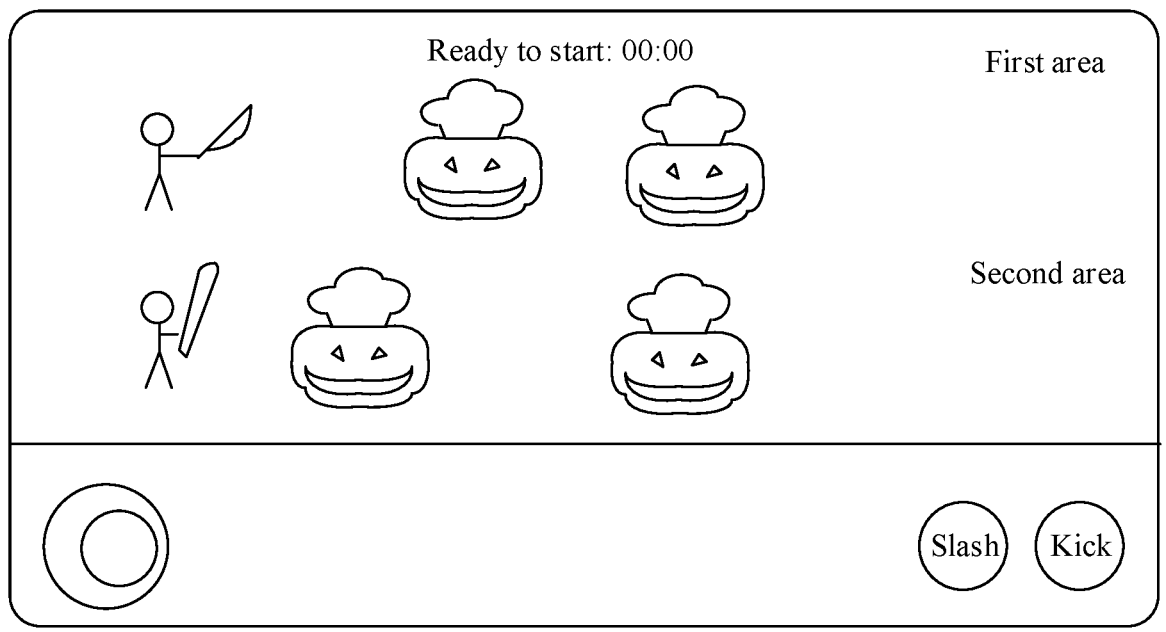
FIG. 8 is a schematic diagram of still another optional data exchange method according to an example embodiment.
Figure 9:
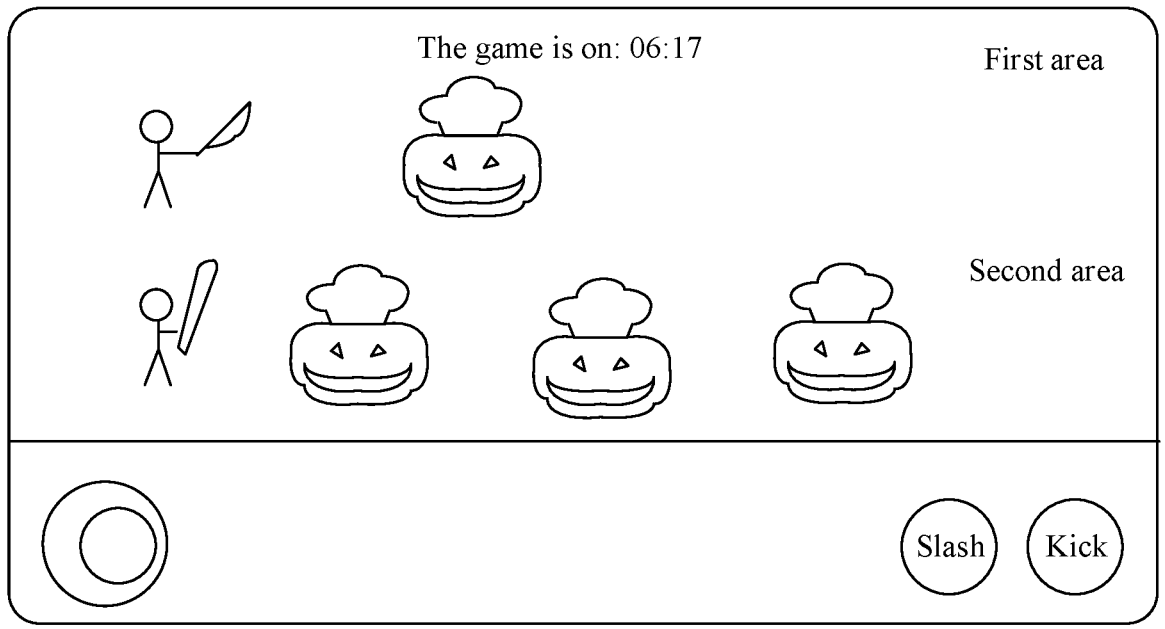
FIG. 9 is a schematic diagram of still another optional data exchange method according to an example embodiment.
Figure 10:
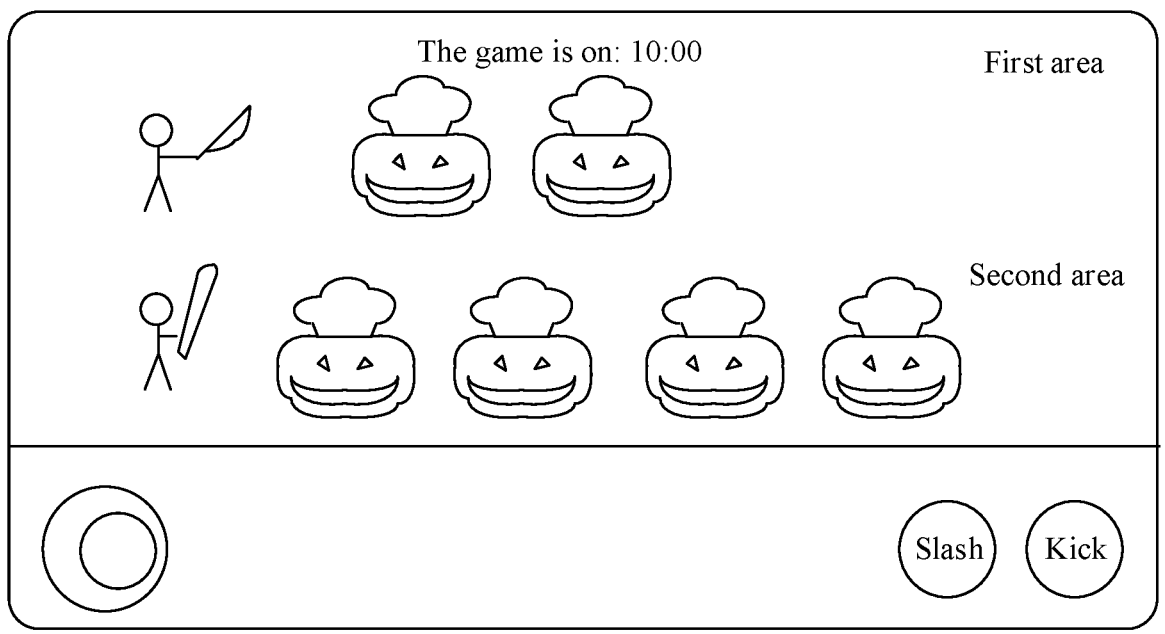
FIG. 10 is a schematic diagram of still another optional data exchange method according to an example embodiment.

FIGS. 8-10 are schematic diagrams of still other optional data exchange methods according to example embodiments. The game application is still used as an example. As shown in FIG. 8, there is a virtual person with a weapon in each of the first area and the second area, and there are two pumpkins in each of the first area and the second area. When the virtual person in the first area attacks a pumpkin in the first area, the virtual person may attack a pumpkin in the second area. Therefore, when the virtual person in the first area performs an attack action, the server determines whether the attack of the virtual person in the first area reaches the virtual person in the second area. If the virtual person in the second area is reached by the attack, the client retains a parameter of the virtual person in the second area, and retains a state of the virtual person in the second area unchanged despite the attack reaching the virtual person in the second area. Similarly, when an attack of the virtual person in the second area reaches the virtual person in the first area, a state of the virtual person in the first area is retained unchanged despite the attack reaching the virtual person in the first area.

Alternatively, a special effect is added for the first virtual character in the first area and the second virtual character in the second area, the special effect being used for retaining the states of the first virtual character in the first area and the second virtual character in the second area unchanged after an attack reaching the first virtual character in the first area is made by the second virtual character in the second area or an attack reaching the second virtual character in the second area is made by the first virtual character in the first area.

The game application is still used as an example, and descriptions are provided with reference to FIG. 8. As shown in FIG. 8, one virtual person and two pumpkins are displayed in each of the first area and the second area. In this case, a special state is added to the virtual person in the first area and the virtual person in the second area, the special state storing current states of the virtual persons in the first area and the second area. When an attack of the virtual person in the first area reaches the virtual person in the second area or an attack of the virtual person in the second area reaches the virtual person in the first area, the current state is read from the special state of the virtual person in the first area, to replace an attacked state, so that the state of the virtual person in the first area is retained unchanged; or the current state is read from the special state of the virtual person in the second area, to replace an attacked state, so that the state of the virtual person in the second area is retained unchanged.

According to an example embodiment of the disclosure, in a method of setting an attacked state by the first client, the first virtual character and the second virtual character are prevented from attacking each other, and the first virtual character and the second virtual character can attack only the virtual objects. In this way, interaction content is enriched, and interaction experience is improved.

As an optional implementation, the disabling, by the first client, an interaction channel between the first virtual character and the second virtual character includes:

adding a first parameter to the first virtual character and/or the first virtual object in a case that the first client detects that there is a feature object in the first area, the first parameter being used for instructing to disable an attack channel of the second virtual character to the first virtual character and/or the first virtual object, and the interaction channel including the attack channel; and adding a second parameter to the second virtual character and/or the second virtual object in a case that the first client detects that there is a feature object in the second area, the second parameter being used for instructing to disable an attack channel of the first virtual character to the second virtual character and/or the second virtual object, and the interaction channel including the attack channel.

Optionally, the feature object is a BUFF generation unit for adding the first parameter or the second parameter to the first virtual character and/or the second virtual character and/or the first virtual object and/or the second virtual object. In this case, the first parameter or the second parameter is BUFF.

For example, invisible BUFF generation units are set in the first area and the second area. For example, the BUFF generation unit may correspond to a feature object of an invisible monster, which is not displayed on a screen. When it is detected that there is an invisible monster in the first area, BUFF is added to the first virtual character, and when an attack of the first virtual character to which the BUFF added acts on a character or an object in another area, a state of the character of the object in the another area is retained unchanged. That is, a virtual character to which the BUFF added can affect only a virtual object in its own area, for example, changing a state of the virtual object of its own area, and cannot change a state of a virtual object in another area.

Using a game as an example, there is a BUFF generation unit in each of the first area and the second area, and the BUFF generation unit may be hidden or displayed. When a game character is generated in the first area or the second area, the BUFF generation unit may issue BUFF to the generated game character. The BUFF may be displayed or hidden. After the BUFF is issued, if a game character (e.g., the first virtual character in FIG. 8) effectively attacks a virtual object, for example, a pumpkin, in its own area (e.g., the first area in FIG. 8), a state of the pumpkin in its own area is changed. However, when the game character attacks a game character or pumpkin in another area (e.g., the second area), even if the game character or pumpkin in the another area can be attacked or covered within a skill range, a state of the game character or pumpkin in the another area is unchanged. For example, the BUFF generation unit may be, but is not limited to, an invisible monster, which does not occupy space on a game screen and is not displayed on the screen, but may add BUFF for a virtual character in the game.

According to an example embodiment, the first virtual character or the second virtual character is prevented from interacting with a virtual object in another area, the first virtual character interacts with the first virtual object, and the second virtual character interacts with the second virtual object. In this way, interaction forms between the virtual characters and the objects are enriched, and interaction experience is improved.

As an optional implementation, in a process of the controlling, by the first client according to the operation instruction, the first virtual character to perform an interaction action on a first virtual object displayed in the first area, the method further includes:

S1: The first client adjusts the state of the first virtual object displayed in the first area and the state of the second virtual object displayed in the second area at an interval of a preset time period.

The adjusting, by the first client, the state of the first virtual object displayed in the first area and the state of the second virtual object displayed in the second area at an interval of a preset time period includes at least one of the following:

(1) increasing, by the first client, an object quantity of first virtual objects displayed in the first area and an object quantity of the second virtual object displayed in the second area in a case that the preset time period is reached; and (2) adjusting, by the first client, the virtual resource value of the first virtual object to increase by a first change value, and the virtual resource value of the second virtual object to increase by a second change value in a case that the preset time period is reached.

The game field is still used as an example. For example, FIG. 8 shows a pumpkin-hitting game on a theme of Halloween. When the game is ready to start, there are two pumpkins with chef hats in each of the first area and the second area. The first client controls the first virtual character to attack the pumpkins in the first area, and the second client controls the second virtual character to attack the pumpkins in the second area. As shown in FIG. 9, when the game is played for 6 minutes and 17 seconds, after the first virtual character attacks and annihilates one pumpkin, a quantity of the pumpkins in the first area is decreased by one. In addition, because the quantity of the pumpkins in the first area is decreased by one, a quantity of the pumpkins in the second area is increased by one. As shown in FIG. 10, when the game is played for 10 minutes, because a preset time is 10 minutes, one pumpkin is added to each of the first area and the second area.

Although it is described in FIG. 10 that one pumpkin is added in each of the first area and the second area in a preset time, this is only an example and each time the game is played for another 10 minutes, a plurality of pumpkins may be added to each of the first area and the second area.

According to an example embodiment of the disclosure, a state of a virtual object is adjusted at an interval of a preset time. In this way, interaction content between characters is enriched, and interaction experience is improved.

As an optional implementation, before the obtaining, by a first client, an operation instruction generated by performing a control operation on a first virtual character controlled by the first client, the method further includes:

S1: The first client assigns, in a virtual character movement layer, a first movement range matching the first area to the first virtual character, and a second movement range matching the second area to the second virtual character, the first movement range and the second movement range being isolated from each other.

Figure 11:
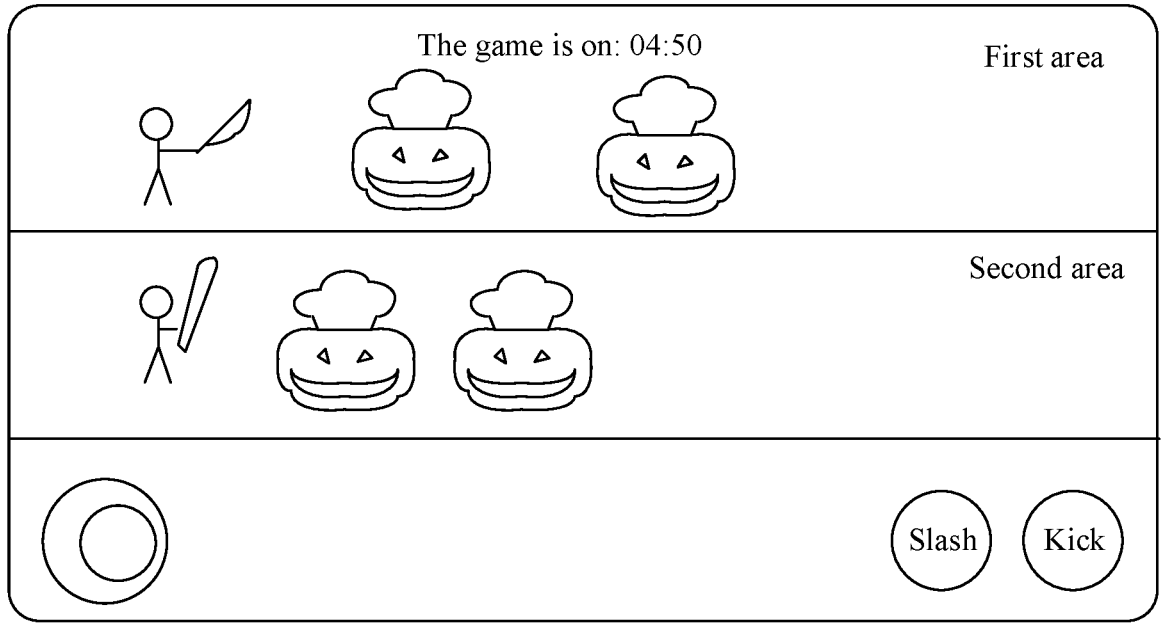
FIG. 11 is a schematic diagram of still another optional data exchange method according to an example embodiment.

FIG. 11 is a schematic diagram of still another optional data exchange method according to an example embodiment. As shown in FIG. 11, the first area is the first movement range, the second area is the second movement range, and an isolation layer is set between the first movement range and the second movement range. As a result, the virtual character in the first movement range cannot move to the second movement range, and the virtual character in the second movement range cannot move to the first movement range. In this way, the first virtual character is isolated from the second virtual character.

The state of the first virtual object in the first area changes with the state of the second virtual object in the second area.

For example, pumpkins in the first area may be displayed more completely after pumpkins in the second area in FIG. 11 are attacked.

That pumpkins in the first area may be displayed more completely after pumpkins in the second area are attacked is only an optional example, and specific conditions are not specifically limited in this embodiment.

According to an example embodiment of the disclosure, the first client sets the isolation layer between the first movement range and the second movement range, so that the first virtual character is prevented from moving to the second area and the second virtual character is prevented from moving to the first area. In this way, interaction forms between the virtual characters are enriched, and interaction experience is improved.

In addition to calculating according to data uploaded by the first client and the second client, obtaining a calculation result, and returning the calculation result to the first client and the second client, the server is further responsible for verifying the data uploaded by the first client and the second client. Specifically, the server verifies the data uploaded by the first client and the second client. For a multiplayer game with more than two players, data reported by all clients is transversely compared, and a client with data much different from data of other clients is determined as an abnormal client. For example, there are a first client, a second client, a third client and a fourth client. Virtual persons controlled by the first client and the third client are teammates, and virtual persons controlled by the second client and the fourth client are teammates. Four users control the four clients to play the game. The server collects and verifies data sent by the four clients. If it is found that data of a client is much different from data of the other three clients, the data of the corresponding client is determined as abnormal, and it is determined that a user of the corresponding client cheats, or a more precise verification is performed. When only two users play the game, there are only two clients. The server compares data uploaded by the two clients with standard data, and determines a client corresponding to more different data from the standard data as a cheating client. In addition, the server further needs to ensure real-time synchronization between a plurality of clients in the game. The server implements real-time synchronization of a multiplayer player-versus-player (PVP) battle by using a technical principle of frame synchronization and a technical principle of a file service protocol (FSP) protocol stack, to ensure that a plurality of players may obtain instant feedback without a feeling of freeze.

For ease of description, the foregoing method embodiments are stated as a series of action combinations. However, a person skilled in the art is to know that the disclosure is not limited to the sequence of the described actions because according to the disclosure, some operations may use another sequence or may be simultaneously performed. In addition, a person skilled in the art should know that the example embodiments described in the specification are optional embodiments and operations and/or modules of the example embodiments are not necessary in the disclosure but may be omitted or replaced.

Figure 12:
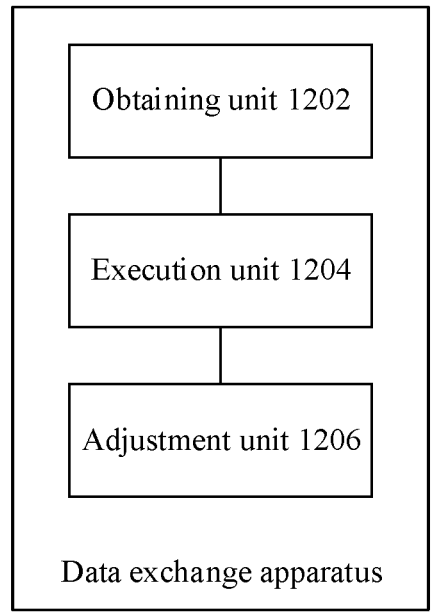
FIG. 12 is a schematic structural diagram of an optional data exchange apparatus according to an example embodiment.

According to another aspect of the embodiments of the disclosure, a data exchange apparatus configured to perform the foregoing data exchange method is further provided. The apparatus is applied to a first client. FIG. 12 is a schematic structural diagram of an optional data exchange apparatus according to an example embodiment. As shown in FIG. 12, the apparatus includes:

an obtaining unit 1202, configured to obtain an operation instruction generated by performing a control operation on a first virtual character controlled by the first client, a first group including the first virtual character being displayed in a first area of a display interface of the first client;

an execution unit 1204, configured to control, according to the operation instruction, the first virtual character to perform an interaction action on a first virtual object displayed in the first area; and an adjustment unit 1206, configured to adjust a state of the first virtual object in the first area to a first target state after the interaction action is performed and adjust a state of a second virtual object displayed in a second area of the display interface to a second target state in a case that the state of the first virtual object changes after the interaction action is performed on the first virtual object, the second area being used for displaying a second group opposing the first group, and a second virtual character included in the second group performing an interaction action on the second virtual object by using a second client.

Optionally, the data exchange apparatus may be applied, but not limited, to the game field. The first virtual character and the second virtual character may each be a controlled virtual person or the like in the game field. The first virtual object and the second virtual object may each be a virtual object interacting with the first virtual person or the second virtual person. The interaction action may be an action for changing a state of the virtual object.

For example, in a game application, there is a first area and a second area. One virtual person and one or more virtual objects are displayed in each of the first area and the second area. After an operation instruction generated by performing a control operation on the virtual person in the first area is obtained, the virtual person in the first area is controlled to perform an interaction action on the virtual object in the first area, the interaction action being used for changing a state of the virtual object in the first area. After the state of the virtual object in the first area changes, the state of the virtual object in the first area is adjusted to a first target state, and a state of the virtual object in the second area is adjusted to a second target state.

The game field may be a multiplayer online battle arena (MOBA) game or a single-player game (SPG), which is not specifically limited herein.

The game application may include, but is not limited to, at least one of the following: a two dimensional (2D) game application, a three dimensional (3D) game application, a virtual reality (VR) game application, an augmented reality (AR) game application, and a mixed reality (MR) game application. The foregoing is merely an example, and this embodiment is not limited thereto.

For example, descriptions are provided with reference to FIG. 3. Referring to FIG. 3, virtual persons as virtual characters, and sandbags as virtual objects are displayed in the figure. Three operation keys on a client are present in the bottom portion of FIG. 3. A key on a left side is a key for controlling a virtual person in the figure to move, and keys on a right side are respectively a key for controlling the virtual person to launch an attack and a key for controlling the virtual person to release a skill. When the client receives an operation instruction for instructing the virtual person in a first area in the figure to attack a sandbag, the client may control, according to the operation instruction, the virtual person in the first area to attack the sandbag. After the attack against the sandbag in the first area is made, the state of the sandbag in the first area is adjusted to a first target state, and a state of the sandbag in a second area is adjusted to a second target state.

Optionally, in this embodiment, the first group including the first virtual character and the second group including the second virtual character may each include, but are not limited to, a plurality of virtual characters. For example, the first virtual character and the second virtual character may be virtual persons. Descriptions are provided in the following with reference to FIG. 3. A virtual person belonging to a first group is present in a first area in FIG. 3; and a virtual person belonging to a second group is present in a second area. Alternatively, two, three, or more virtual persons belonging to the first group may be set in the first area; and two, three, or more virtual persons belonging to the second group may be set in the second area. Quantities of virtual persons in the first group and the second group and quantities of virtual objects are not specifically limited in this embodiment.

Optionally, the first area and the second area in this embodiment are two areas that do not overlap, and are not limited to positions shown in FIG. 3. The first area may be located above the second area, Specific positions of the two areas are not specifically limited herein.

Optionally, the performed interaction action may be attacking the virtual object, moving the virtual object, adding an element to or removing an element from the virtual object, interacting with the virtual object, or another interaction action capable of changing the state of the virtual object.

Optionally, in this embodiment, the first target state and the second target state may be, but are not limited to, different states, for example, states with opposite trends. For example, the first target state may be a small state, a transparent state, or the like, and the second target state may be a large state, a displayed state, or the like. The first target state may be a decreased quantity state, and the second target state may be an increased quantity. For example, when the first target state is a small state, the second target state is a large state; when the first target state is a transparent state, the second target state may be a displayed state. When the first target state is a decreased quantity decrease, the second target state is an increased quantity state.

The small, large, transparent, displayed, decreased quantity, increased quantity, and other states are only given as examples, and are not specifically limited in this embodiment.

Optionally, the adjust a state of the first virtual object in the first area to a first target state after the interaction action is performed and adjust a state of a second virtual object displayed in a second area of the display interface to a second target state in a case that the state of the first virtual object changes after the interaction action is performed includes: S1: Adjust the state of the first virtual object in the first area to the first target state corresponding to a negative change to the first virtual object (e.g., decrease in quantity, size, or visibility) and adjust the state of the second virtual object in the second area to the second target state corresponding to a positive change to the second virtual object (e.g., increase in quantity, size, or visibility) in the case that the state of the first virtual object changes after the interaction action is performed.

Optionally, the negative change may be changing from the second target state to the first target state, and the positive change may be changing from the first target state to the second target state. For example, the first target state may be small, disappeared, or the like, and the second target state may be large, appeared, or the like. In this case, the changing from the second target state to the first target state may be changing from the large state to the small state, or from the visible or displayed state to the invisible or transparent state; and the changing from the first target state to the second target state may be changing from the small state to the large state, or from the invisible or transparent state to the visible or displayed state.

The foregoing are merely an example. In this embodiment of the disclosure, the small state is not limited to corresponding to the large state. Alternatively, the first target state is large, and the second target state is small, which is not specifically limited in this embodiment.

Optionally, the controlling, by the first client according to the operation instruction, the first virtual character to perform an interaction action on a first virtual object displayed in the first area may be: after receiving an operation instruction that is sent by a user to the first client, controlling, by the first client according to the operation instruction, the first virtual character in the first area to perform the interaction action on the first virtual object in the first area, and sending a parameter corresponding to the interaction action to a server. For example, after the first virtual character attacks the first virtual object, parameters such as an attack value of the first virtual character and whether a skill is used are sent to the server. The server receives the parameter sent by the first client and a parameter sent by the second client. After receiving the parameter sent by the first client and the parameter sent by the second client, the server calculates according to the parameters, for example, calculating according to the attack value of the first virtual character, whether the skill is used, and the like to determine whether and how much the state of the first virtual object is to be changed; and calculating according to attributes such as an action and an attack value of the second virtual character to determine whether and how much the state of the second virtual object is to be changed, and sends the calculation result to the first client and the second client. After receiving the calculation result, the first client adjusts the states of the first virtual character and the first virtual object on the first client according to the calculation result. For example, if the server calculates and obtains that the state of the first virtual object is changed after the first virtual character attacks the first virtual object, for example, a quantity of first virtual objects is reduced from five to four, the server sends the state of the first virtual object to the first client, and the first client displays a changed quantity of first virtual objects. In addition, the server sends the calculation result to the second client, so that the second client adjusts the displayed second virtual object according to the calculation result.

Optionally, before obtaining the operation instruction generated by performing the control operation on the first virtual character controlled by the first client, the apparatus is further configured to: S1: Display the first virtual character and the first virtual object in the first area according to a character coordinate address that is located in the first area and that is assigned to the first virtual character in the first group and an object coordinate address that is located in the first area and that is assigned to the first virtual object. S2: Display the second virtual character and the second virtual object in the second area according to a character coordinate address that is located in the second area and that is assigned to the second virtual character in the second group and an object coordinate address that is located in the second area and that is assigned to the second virtual object. The second virtual object and the first virtual character possess the same group tag, and the first virtual object and the second virtual character possess the same group tag.

Optionally, the second virtual object and the first virtual character belong to the same camp, and the first virtual object and the second virtual character belong to the same camp.

For example, after the first virtual object is displayed after refresh in the first area, the first virtual character in the first area may attack the first virtual object in the first area, and after the second virtual object is displayed after refresh in the second area, the second virtual character in the second area may attack the second virtual object in the second area. The first virtual object in the first area and the second virtual object in the second area may be set to belong to different camps and carrying different camp identifiers. For example, the first virtual object belongs to a camp A, and the second virtual object belongs to a camp B, camp identifiers of the two camps being different. The first virtual character belongs to the camp B. The first virtual character cannot attack the second virtual object in the camp B, and can attack only the first virtual object in the camp A. The second virtual character belongs to the camp A. The second virtual character can attack only the second virtual object in the camp B.

Optionally, the data exchange apparatus is further configured to: disable an interaction channel between the first virtual character and the second virtual character before the operation instruction generated by performing the control operation on the first virtual character controlled by the first client is obtained; and retain a state of the second virtual character unchanged in a case that the first virtual character performs the interaction action on the first virtual object and the second virtual character is within an action coverage range of the interaction action, in a process of controlling, according to the operation instruction, the first virtual character to perform the interaction action on the first virtual object displayed in the first area.

For example, if a skill used when the first virtual character attacks the first virtual object covers the first virtual object, the first virtual object is attacked, and the state of the first virtual object may be changed. However, because the interaction channel between the first virtual character and the second virtual character is disabled, the first virtual character cannot attack the second virtual character. In addition, because the first virtual character and the second virtual object belong to the same camp, the first virtual character cannot attack the second virtual object. For example, the first area and the second area are set to areas that do not overlap. A first birth point is set in the first area, and the first virtual character is generated at the first birth point. A second birth point is set in the second area, and the second virtual character is generated at the second birth point. The first virtual character is allowed to move only in the first area, and the second virtual character is allowed to move only in the second area.

Although the first virtual character and the second virtual character are isolated in position, because skills are not isolated, an attack or a skill released by the first virtual character may reach the second virtual character or the second virtual object in the second area, and changes the state of the second virtual character or the second virtual object. Therefore, to prevent the state of the second virtual character or the second virtual object in the second area from being changed by the attack of the first virtual character in the first area, or to prevent the state of the first virtual character or the first virtual object in the first area from being changed by an attack of the second virtual character in the second area, BUFF (which is generally a gain effect or a special effect in a game) is configured for the first virtual character born in the first area and the second virtual character born in the second area. With the BUFF configured, even if an attack by the first virtual character reaches the second virtual character and the second virtual object in the second area, the states of the second virtual character and the second virtual object are unchanged, and even if an attack by the second virtual character in the second area reaches the first virtual character and the first virtual object in the first area, the states of the first virtual character and the first virtual object are unchanged. For example, an invisible monster, building, character, or the like is respectively generated in each of the first area and the second area, to add the BUFF to the first virtual character and the second virtual character to the effect that the states of the first virtual character and the second virtual character are unchanged even if a skill or an attack is applied by the second virtual character or the first virtual character.

Optionally, when obtaining the operation instruction generated by performing the control operation on the first virtual character controlled by the first client, the client sends a parameter in the operation instruction to the server, and the server completes the interaction between the first virtual character and the second virtual character. For example, after the server receives parameters that are uploaded by the clients and that are respectively included in operation instructions for controlling the first virtual character and the second virtual character, when determining that the first virtual character is within an attack range of the second virtual character or the second virtual character is within an attack range of the first virtual character, the server returns a parameter for retaining the state of the first virtual character or the state of the second virtual character unchanged so that the state of the first virtual character or the state of the second virtual character is unchanged even if an attack is made by the second virtual character or the first virtual character.

Specifically, descriptions are provided with reference to FIG. 3. The first virtual character and the second virtual character may be virtual persons, the first virtual object and the second virtual object may be sandbags, and the interaction action may be an attack. When attacking a sandbag, the virtual person in the first area may attack the virtual person in the second area. Therefore, after receiving an attack parameter, which is sent by the client, of the virtual person in the first area, the server determines whether the attack parameter indicates that the virtual person in the second area can be reached by the attack. If the virtual person in the second area can be reached by the attack, the server returns a parameter for retaining the state of the virtual person in the second area unchanged. Similarly, if the virtual person in the second area can attack the virtual person in the first area when attacking a sandbag, the server returns a parameter for retaining the state of the virtual person in the first area unchanged. In this way, the virtual person in the first area and the virtual person in the second area are prevented from attacking each other.

Optionally, an attacked state may be preset for the first virtual character and the second virtual character. When the first virtual character and the second virtual character are attacked, a corresponding attacked state, for example, being knocked down or stunned, is displayed.

Optionally, in a process of controlling, according to the operation instruction, the first virtual character to perform the interaction action on the first virtual object displayed in the first area, the apparatus is further configured to: S1: Adjust the state of the first virtual object displayed in the first area and the state of the second virtual object displayed in the second area at an interval of a preset time period.

For example, when controlling, according to the operation instruction, the first virtual character to perform the interaction action on the first virtual object displayed in the first area, the first client sends interaction data such as the attack value of the first virtual character and a virtual health point of the first virtual character to the server, and the server obtains a calculation result after calculating according to the data uploaded by the first client and the second client. For example, if the calculation result indicates that the quantity of first virtual objects is decreased by one, and the quantity of the second virtual object is increased by one, the server returns the result to the first client, and the first client decreases the quantity of first virtual objects in the display interface by one, and increases the quantity of the second virtual object by one according to the result.

Optionally, an additional condition may further be preset. When the additional condition is satisfied, the states of the first virtual object and the second virtual object are adjusted.

Optionally, the additional condition may be time, a quantity of virtual objects, a quantity of virtual characters, or the like.

Optionally, before obtaining the operation instruction generated by performing the control operation on the first virtual character controlled by the first client, the apparatus is further configured to: S1: Assign, in a virtual character movement layer, a first movement range matching the first area to the first virtual character, and a second movement range matching the second area to the second virtual character, the first movement range and the second movement range being isolated from each other.

Optionally, the virtual character movement layer may be divided into two equal or unequal parts. One part is the first area, and the other part is the second area. Alternatively, the virtual character movement layer is divided into a plurality of parts. Any one of the parts is the first area, and any other part other than the first area is the second area. The first area may be on a left side, a right side, an upper side, a lower side, or another position of the second area, which is not specifically limited herein. The second area may disposed opposite to the first area and not overlap with the first area. The second area is not specifically limited to a certain position.

Optionally, the expression "being isolated from each other" may mean that the areas do not communicate with each other, and the virtual characters cannot move from one area to another area.

Optionally, scores may be set for the first virtual character and the second virtual character. After the first virtual character performs the interaction action on the first virtual object in the first area, the score of the first virtual character may be changed; or after the second virtual character performs the interaction action on the second virtual object in the second area, the score of the second virtual character may be changed. Using a game application as an example, the first virtual character and the second virtual character may be virtual persons, the first virtual object and the second virtual object may be virtual enemies, and the interaction action may be an attack. A score is set for each virtual person. When the virtual person in the first area attacks an enemy in the first area, the score of the virtual person in the first area may be correspondingly increased. When the virtual person in the second area attacks an enemy in the second area, the score of the virtual person in the second area may be correspondingly increased. For example, the virtual person in the first area attacks and kills an enemy, the score is correspondingly increased by 100, and when the score of the virtual person gets a score 1000, the virtual person wins the game.

That the score is correspondingly increased by 100 and the virtual person wins the game when getting 1000 are only examples, and do not constitute a limitation to the disclosure. For example, when the virtual person in the first area attacks enemies in the first area, once the virtual person kills one enemy, the score is correspondingly increased by 100, while 100 or another value is subtracted from the score of the virtual person in the second area. When the virtual person in the second area kills one enemy, the score is correspondingly increased by 100, while 100 or another value is subtracted from the score of the virtual person in the first area, so that the virtual person in the first area competes with the virtual person in the second area. Alternatively, when the virtual person in the first area kills one enemy, one enemy is correspondingly generated in the second area, the enemy generated in the second area belonging to the same camp as the virtual person in the first area. After the virtual person in the second area kills one enemy, one enemy is correspondingly generated in the first area, the enemy generated in the first area belonging to the same camp as the virtual person in the second area. In addition, a score may also be set for each virtual object in the first area and the second area. After the first virtual character in the first area performs the interaction action on the first virtual object in the first area, the score corresponding to the first virtual object is assigned to the first virtual character in the first area. After the second virtual character in the second area performs the interaction action on the second virtual object in the second area, the score corresponding to the second virtual object is assigned to the second virtual character in the second area.

According to an example embodiment of the disclosure, the operation instruction generated by performing the control operation on the first virtual character controlled by the first client is obtained, the first virtual character is controlled according to the operation instruction to perform the interaction action on the first virtual object displayed in the first area, and the state of the first virtual object in the first area is adjusted to the first target state after the interaction action and the state of the second virtual object displayed in the second area of the display interface is adjusted to the second target state in the case that the state of the first virtual object changes after the interaction action is performed. In this way, interaction manners between different virtual objects are enriched, and interaction experience is improved.

As an optional implementation, the adjustment unit includes:

(1) a first adjustment module, configured to adjust the state of the first virtual object in the first area to the first target state corresponding to a negative change to the first virtual object (e.g., decrease in quantity, size, or visibility) and adjust the state of the second virtual object in the second area to the second target state corresponding to a positive change to the second virtual object (e.g., increase in quantity, size, or visibility) in the case that the state of the first virtual object changes after the interaction action is performed.

The first adjustment module includes at least one of the following:

(1) a deletion submodule, configured to delete the first virtual object from the first area and display the newly added second virtual object in the second area in a case that the first virtual object satisfies a disappearance condition after the interaction action is performed; and (2) a first adjustment submodule, configured to adjust a virtual resource value of the first virtual object in the first area to decrease to a first target value and adjust a virtual resource value of the second virtual object in the second area to increase to a second target value in a case that the virtual resource value of the first virtual object decreases after the interaction action is performed.

According to an example embodiment of the disclosure, the states of the first virtual object and the second virtual object are changed according to the interaction actions of the first virtual character and the second virtual character. In this way, interaction manners between different virtual characters are enriched, and interaction experience is improved.

As an optional implementation, the apparatus further includes:

(1) a first display unit, configured to display the first virtual character and the first virtual object in the first area according to a character coordinate address that is located in the first area and that is assigned to the first virtual character in the first group and an object coordinate address that is located in the first area and that is assigned to the first virtual object; and (2) a second display unit, configured to display the second virtual character and the second virtual object in the second area according to a character coordinate address that is located in the second area and that is assigned to the second virtual character in the second group and an object coordinate address that is located in the second area and that is assigned to the second virtual object.

The second virtual object and the first virtual character possess the same group tag, and the first virtual object and the second virtual character possess the same group tag.

According to an example embodiment of the disclosure, the first virtual character, the first virtual object, the second virtual character and the second virtual object are displayed by using coordinates, so that generation positions of the virtual objects and the virtual characters may be fixed, thereby preventing a problem that the generation positions of the virtual objects and the virtual characters are inappropriate. Accordingly, interaction experience between the characters is improved.

As an optional implementation, the apparatus further includes:

(1) a disabling unit, configured to disable an interaction channel between the first virtual character and the second virtual character before the operation instruction generated by performing the control operation on the first virtual character controlled by the first client is obtained; and (2) a control unit, configured to retain a state of the second virtual character unchanged in a case that the first virtual character performs the interaction action on the first virtual object and the second virtual character is within an action coverage range of the interaction action, in a process of controlling, according to the operation instruction, the first virtual character to perform the interaction action on the first virtual object displayed in the first area.

According to an example this embodiment of the disclosure, in a method of setting an attacked state, the first virtual character and the second virtual character are prevented from attacking each other, and the first virtual character and the second virtual character can attack only the virtual objects. In this way, interaction content is enriched, and interaction experience is improved.

As an optional implementation, the disabling unit includes:

(1) a first adding module, configured to add a first parameter to the first virtual character and/or the first virtual object in a case that the first client detects that there is a feature object in the first area, the first parameter being used for instructing to disable an attack channel of the second virtual character to the first virtual character and/or the first virtual object, and the interaction channel including the attack channel; and (2) a second adding module, configured to add a second parameter to the second virtual character and/or the second virtual object in a case that the first client detects that there is a feature object in the second area, the second parameter being used for instructing to disable an attack channel of the first virtual character to the second virtual character and/or the second virtual object, and the interaction channel including the attack channel.

According to an example embodiment, the first virtual character or the second virtual character is prevented from interacting with a virtual object in another area, the first virtual character interacts with the first virtual object, and the second virtual character interacts with the second virtual object. In this way, interaction forms between the virtual characters and the objects are enriched, and interaction experience is improved.

As an optional implementation, the execution unit further includes:

(1) a second adjustment module, configured to adjust the state of the first virtual object displayed in the first area and the state of the second virtual object displayed in the second area at an interval of a preset time period.

The second adjustment module includes at least one of the following:

(1) an increase submodule, configured to increase an object quantity of first virtual objects displayed in the first area and an object quantity of the second virtual object displayed in the second area in a case that the preset time period is reached; and (2) a second adjustment submodule, configured to adjust the virtual resource value of the first virtual object to increase by a first change value, and the virtual resource value of the second virtual object to increase by a second change value in a case that the preset time period is reached.

According to an example embodiment of the disclosure, a state of a virtual object is adjusted at an interval of a preset time. In this way, interaction content between characters is enriched, and interaction experience is improved.

As an optional implementation, the apparatus further includes:

(1) an assignment unit, configured to assign, in a virtual character movement layer, a first movement range matching the first area to the first virtual character, and a second movement range matching the second area to the second virtual character, the first movement range and the second movement range being isolated from each other.

According to an example embodiment of the disclosure, the isolation layer is set between the first movement range and the second movement range, so that the first virtual character is prevented from moving to the second area and the second virtual character is prevented from moving to the first area. In this way, interaction forms between the virtual characters are enriched, and interaction experience is improved.

In addition to calculating according to data uploaded by the first client and the second client, obtaining a calculation result, and returning the calculation result to the first client and the second client, the server is further responsible for verifying the data uploaded by the first client and the second client. Specifically, the server verifies the data uploaded by the first client and the second client. For a multiplayer game with more than two players, data reported by all clients is transversely compared, and a client with data much different from data of other clients is determined as an abnormal client. For example, there are a first client, a second client, a third client and a fourth client. Virtual persons controlled by the first client and the third client are teammates, and virtual persons controlled by the second client and the fourth client are teammates. Four users control the four clients to play the game. The server collects and verifies data sent by the four clients. If it is found that data of a client is much different from data of the other three clients, the data of the corresponding client is determined as abnormal, and it is determined that a user of the corresponding client cheats, or a more precise verification is performed. When only two users play the game, there are only two clients. The server compares data uploaded by the two clients with standard data, and determines a client corresponding to more different data from the standard data as a cheating client. In addition, the server further needs to ensure real-time synchronization between a plurality of clients in the game. The server implements real-time synchronization of a multiplayer PVP battle by using a technical principle of frame synchronization and a technical principle of an FSP protocol stack, to ensure that a plurality of players may obtain instant feedback without a feeling of freeze.

An embodiment of the disclosure further provides a storage medium. Optionally, in this embodiment, the storage medium is configured to store a computer program for performing the following operations:

S1: Obtain an operation instruction generated by performing a control operation on a first virtual character controlled by the first client, a first group including the first virtual character being displayed in a first area of a display interface of the first client.

S2: Control, according to the operation instruction, the first virtual character to perform an interaction action on a first virtual object displayed in the first area.

S3: Adjust a state of the first virtual object in the first area to a first target state after the interaction action is performed and adjust a state of a second virtual object displayed in a second area of the display interface to a second target state in a case that the state of the first virtual object changes after the interaction action is performed, the second area being used for displaying a second group opposing the first group, and a second virtual character included in the second group performing an interaction action on the second virtual object by using a second client.

Optionally, in this embodiment, the storage medium may include, but is not limited to, any medium that can store a computer program, such as a USB flash drive, a read-only memory (ROM), a random access memory (RAM), a removable hard disk, a magnetic disk, or an optical disc.

Optionally, for a specific example in this embodiment, the examples described in the above example embodiments may be referred to, and details are not described herein again in this embodiment.

Figure 13:
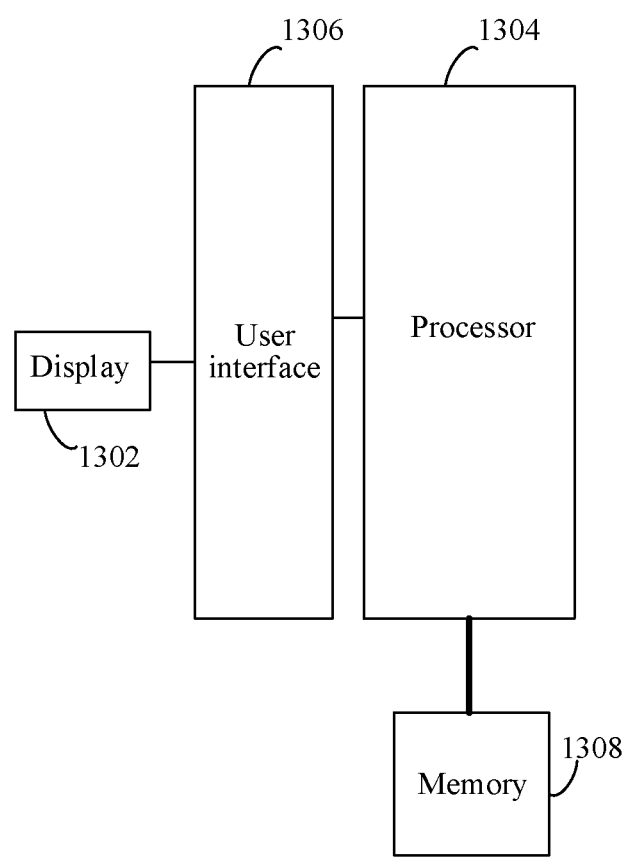
FIG. 13 is a schematic structural diagram of an optional electronic device according to an example embodiment.

According to still another aspect of the embodiments of the disclosure, an electronic device configured to implement the foregoing data exchange method is further provided. FIG. 13 is a schematic structural diagram of an optional electronic device according to an example embodiment. As shown in FIG. 13, the electronic device includes: (1) a display 1302, (2) a processor 1304, (3) a user interface 1306, and (4) a memory 1308.

Optionally, in this embodiment, the foregoing electronic device may be located in at least one of a plurality of network devices in a computer network.

Optionally, in this embodiment, the processor may be configured to perform the following operations by using a computer program: S1: Obtain an operation instruction generated by performing a control operation on a first virtual character controlled by the first client, a first group including the first virtual character being displayed in a first area of a display interface of the first client.

S2: Control, according to the operation instruction, the first virtual character to perform an interaction action on a first virtual object displayed in the first area.

S3: Adjust a state of the first virtual object in the first area to a first target state after the interaction action is performed and adjust a state of a second virtual object displayed in a second area of the display interface to a second target state in a case that the state of the first virtual object changes after the interaction action is performed, the second area being used for displaying a second group opposing the first group, and a second virtual character included in the second group performing an interaction action on the second virtual object by using a second client.

The memory 1308 may be configured to store a software program and module, for example, a program instruction/module corresponding to the data exchange method and apparatus in the embodiments of the disclosure. The processor 1304 runs the software program and module stored in the memory 1308, to implement various functional applications and data processing, that is, implement the foregoing data exchange method. The memory 1308 may include a non-transitory memory, such as a high-speed random memory, and a non-volatile memory such as one or more magnetic storage apparatuses, a flash, or another non-volatile solid-state memory. In some examples, the memory 1308 may further include memories remotely disposed relative to the processor 1304, and these remote memories may be connected to a terminal through a network. Instances of the network include, but are not limited to, the Internet, an intranet, a local area network, a mobile communications network, and a combination thereof.

The user interface 1306 is configured to receive or send data through a network. Specific instances of the foregoing network may include a wired network and a wireless network. In an example, the user interface 1306 includes a network interface controller (NIC), which may be connected to another network device and a router by using a network cable, so as to communicate with the Internet or the local network. In an example, the user interface 1306 is a radio frequency (RF) module configured to communicate with the Internet in a wireless manner.

The memory 1308 is configured to store states of the virtual characters and the virtual objects, and the like.

A person of ordinary skill in the art would understand that, the structure shown in FIG. 13 is only given as an example and any modifications or changes can be made. The electronic device may alternatively be a terminal device such as a smartphone (such as an Android mobile phone or an iOS mobile phone), a tablet computer, a palmtop computer, a mobile Internet device (MID), or a PAD. FIG. 13 does not limit the structure of the foregoing electronic device. For example, the electronic device 13 may further include more or less components (such as a network interface) than those shown in FIG. 13, or have configuration different from that shown in FIG. 13.

A person of ordinary skill in the art would understand that all or some of the operations of the methods in the foregoing example embodiments may be implemented by a program instructing relevant hardware of the terminal device. The program may be stored in a computer-readable storage medium. The storage medium may include a flash disk, a ROM, a RAM, a magnetic disk, an optical disc, and the like.

Optionally, for a specific example in this embodiment, the contents in the foregoing example embodiments of the data exchange method and the foregoing example embodiments of the data exchange apparatus may be referred to, and details are not described in this embodiment again.

The sequence numbers of the foregoing example embodiments of the disclosure are merely for description purpose and do not indicate the preference of the embodiments.

In a case that the integrated unit in the foregoing example embodiments is implemented in the form of a software function unit and sold or used as an independent product, the integrated unit may be stored in the foregoing computer-readable storage medium. Based on such understanding, the technical solutions of the disclosure essentially, or some contributing to the related technology, or all or some of the technical solutions may be implemented in a form of a software product. The computer software product is stored in a storage medium and includes instructions for instructing one or more computer devices (which may be a PC, a server, a network device, or the like) to perform all or some of operations of the methods in the embodiments of the disclosure.

In the foregoing example embodiments of the disclosure, descriptions of the example embodiments have different emphases, and as for parts that are not described in detail in one embodiment, reference can be made to the relevant descriptions of the other embodiments.

In various example embodiments provided in the disclosure, it is understood that the disclosed client may be implemented in other manners. The apparatus embodiments described above are merely examples. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the disclosure may be integrated into one processing unit, or each of the units may exist alone physically, or two or more units are integrated into one unit. The integrated unit may be implemented in the form of hardware, or may be implemented in the form of a software functional unit.

The above descriptions are merely optional implementations of the disclosure, and a person of ordinary skill in the art can make various improvements and refinements without departing from the spirit of the disclosure. All such modifications and refinements are to be intended to be covered by the disclosure.

INDUSTRIAL APPLICABILITY

In the example embodiments of the disclosure, the first group including the first virtual character is displayed in the first area of the display interface of the first client, and in the case that the state of the first virtual object changes after the first client receives the interaction action performed by the first virtual character on the first virtual object in the first area, the state of the first virtual object in the first area is adjusted to the first target state after performing the interaction action on the first virtual object, and the state of the second virtual object in the second area in the display interface is adjusted to the second target state, the second area being used for displaying the second group opposing the first group, and the second virtual character included in the second group performing the interaction action on the second virtual object by using the second client. In this way, interaction manners between different virtual characters are enriched, and an interaction effect is improved.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

According to example embodiments of the disclosure, the first group including the first virtual character is displayed in the first area of the display interface of the first client, and in the case that the state of the first virtual object changes after the first client receives the interaction action performed by the first virtual character on the first virtual object in the first area, the state of the first virtual object in the first area is adjusted to the first target state, and the state of the second virtual object in the second area in the display interface is adjusted to the second target state, the second area being used for displaying the second group opposing the first group, and the second virtual character included in the second group performing the interaction action on the second virtual object by using the second client. In this manner, interaction manners between different virtual characters are enriched, and an interaction effect is improved, thereby solving technical problems that only a relatively poor quality interaction effect is achieved by a relatively undiversified data exchange manner provided in the related art.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A method of displaying a user interface that is updated according to a user interaction, comprising:
    displaying, by a first client comprising at least one processor and executing an application, a user interface of the application, the user interface including a first area in which a first virtual character controlled by the first client and a first virtual object are displayed and a second area in which a second virtual character controlled by a second client and a second virtual object, the first area and the second area opposing each other and the first client and the second client being different from each other;
    receiving, by the first client, an operation instruction based on a control operation on the first virtual character;
    controlling, by the first client according to the operation instruction, the first virtual character to perform an interaction action on the first virtual object displayed in the first area; and
    adjusting, by the first client, a state of the first virtual object in the first area to a first target state based on the interaction action performed on the first virtual object and adjusting, without an operation instruction from the second client, a state of the second virtual object displayed in the second area of the user interface to a second target state in response to the state of the first virtual object being changed based on the interaction action performed on the first virtual object.

2. The method according to claim 1, wherein the adjusting the state of the first virtual object and the state of the second virtual object comprises:
    adjusting, by the first client, the state of the first virtual object in the first area to the first target state corresponding to a negative change based on the interaction action performed on the first virtual object, and adjusting the state of the second virtual object in the second area to the second target state corresponding to a positive change in response to the state of the first virtual object being changed corresponding to the negative change.

3. The method according to claim 2, wherein the adjusting the state of the first virtual object corresponding to the negative and adjusting the state of the second virtual object corresponding to the positive change comprises at least one of the following:
    deleting, by the first client, the first virtual object from the first area and displaying a newly added second virtual object in the second area; and
    adjusting, by the first client, a virtual resource value of the first virtual object in the first area to decrease to a first target value and adjusting a virtual resource value of the second virtual object in the second area to increase to a second target value.

4. The method according to claim 1, prior to the obtaining, the method further comprising:
    displaying, by the first client, the first virtual character in the first area according to a character coordinate address that is located in the first area and that is assigned to the first virtual character, and displaying the first virtual object in the first area according to an object coordinate address that is located in the first area and that is assigned to the first virtual object; and
    displaying, by the first client, the second virtual character in the second area according to a character coordinate address that is located in the second area and that is assigned to the second virtual character, and displaying the second virtual object according to an object coordinate address that is located in the second area and that is assigned to the second virtual object.

5. The method according to claim 1, prior to the obtaining, the method further comprising:
    disabling, by the first client, an interaction channel between the first virtual character and the second virtual character,
    wherein the controlling comprises retaining, by the first client, a state of the second virtual character unchanged regardless of whether the second virtual character is within an action coverage range of the interaction action performed by the first virtual character on the first virtual object.

6. The method according to claim 5, wherein the disabling comprises:
    adding a first parameter to the first virtual character and/or the first virtual object based on detection of a feature object in the first area, an attack channel of the second virtual character to the first virtual character and/or the first virtual object, included in the interaction channel, being disabled based on the first parameter; and
    adding a second parameter to the second virtual character and/or the second virtual object based on detection of a feature object in the second area, an attack channel of the first virtual character to the second virtual character and/or the second virtual object, included in the interaction channel, being disabled based on the second parameter.

7. The method according to claim 1, the controlling comprising:
    adjusting, by the first client, the state of the first virtual object displayed in the first area and the state of the second virtual object displayed in the second area at an interval of a preset time period.

8. The method according to claim 7, wherein the adjusting the state of the first virtual object and the state of the second virtual object at the interval of the preset time period comprises at least one of the following:
    increasing, by the first client, an object quantity of the first virtual object and an object quantity of the second virtual object at the interval of the preset time period; and
    adjusting, by the first client, a virtual resource value of the first virtual object to increase by a first change value, and a virtual resource value of the second virtual object to increase by a second change value at the interval of the preset time period.

9. The method according to claim 1, prior to the obtaining, the method further comprising:
    assigning, by the first client in a virtual character movement layer, a first movement range matching the first area to the first virtual character, and a second movement range matching the second area to the second virtual character, the first movement range and the second movement range not overlapping with each other.

10. An apparatus for displaying a user interface that is updated according to a user interaction, applied to a first client, the apparatus comprising:
at least one memory configured to store program code; and
at least one processor configured to read the program code and operate as instructed by the program code, the program code comprising:
displaying code configured to cause at least one of the at least one processor to display a user interface of an application, the user interface including a first area in which a first virtual character controlled by the first client and a first virtual object are displayed and a second area in which a second virtual character controlled by a second client and a second virtual object, the first area and the second area opposing each other and the first client and the second client being different from each other;
receiving code configured to cause at least one of the at least one processor to receive an operation instruction based on a control operation on the first virtual character;
execution code configured to cause at least one of the at least one processor to control, according to the operation instruction, the first virtual character to perform an interaction action on the first virtual object displayed in the first area; and
adjustment code configured to cause at least one of the at least one processor to adjust a state of the first virtual object in the first area to a first target state based on the interaction action performed on the first virtual object and adjust, without an operation instruction from the second client, a state of the second virtual object displayed in the second area of the user interface to a second target state in response to the state of the first virtual object being changed based on the interaction action performed on the first virtual object.

11. The apparatus according to claim 10, wherein the adjustment code comprises:
first adjustment code configured to cause at least one of the at least one processor to adjust the state of the first virtual object in the first area to the first target state corresponding to a negative change based on the interaction action performed on the first virtual object, and adjust the state of the second virtual object in the second area to the second target state corresponding to a positive change in response to the state of the first virtual object being changed corresponding to the negative change.

12. The apparatus according to claim 11, wherein the first adjustment code comprises at least one of the following:
deletion code configured to cause at least one of the at least one processor to delete the first virtual object from the first area and display a newly added second virtual object in the second area; and
second adjustment code configured to cause at least one of the at least one processor to adjust a virtual resource value of the first virtual object in the first area to decrease to a first target value and adjust a virtual resource value of the second virtual object in the second area to increase to a second target value.

13. The apparatus according to claim 10, wherein the program code further comprises:

first display code configured to cause at least one of the at least one processor to display the first virtual character in the first area according to a character coordinate address that is located in the first area and that is assigned to the first virtual character, and display the first virtual object in the first area according to an object coordinate address that is located in the first area and that is assigned to the first virtual object; and
second display code configured to cause at least one of the at least one processor to display the second virtual character in the second area according to a character coordinate address that is located in the second area and that is assigned to the second virtual character, and display the second virtual object in the second area according to an object coordinate address that is located in the second area and that is assigned to the second virtual object.

14. The apparatus according to claim 10, wherein the program code further comprises:
disabling code configured to cause at least one of the at least one processor to disable an interaction channel between the first virtual character and the second virtual character before the operation instruction generated by performing the control operation on the first virtual character controlled by the first client is obtained; and
control code configured to cause at least one of the at least one processor to retain a state of the second virtual character unchanged regardless of whether the second virtual character is within an action coverage range of the interaction action performed by the first virtual character on the first virtual object.

15. The apparatus according to claim 14, wherein the disabling code comprises:
first adding code configured to cause at least one of the at least one processor to add a first parameter to the first virtual character and/or the first virtual object based on detection of a feature object in the first area, an attack channel of the second virtual character to the first virtual character and/or the first virtual object, included in the interaction channel, being disabled based on the first parameter; and
second adding code configured to cause at least one of the at least one processor to add a second parameter to the second virtual character and/or the second virtual object based on detection of a feature object in the second area, an attack channel of the first virtual character to the second virtual character and/or the second virtual object, included in the interaction channel, being disabled based on the second parameter.

16. The apparatus according to claim 10, wherein the execution code comprises:
third adjustment code configured to cause at least one of the at least one processor to adjust the state of the first virtual object displayed in the first area and the state of the second virtual object displayed in the second area at an interval of a preset time period.

17. The apparatus according to claim 16, wherein the third adjustment code comprises at least one of the following:
increase code configured to cause at least one of the at least one processor to increase an object quantity of the first virtual object and an object quantity of the second virtual object at the interval of the preset time period; and
fourth adjustment code configured to cause at least one of the at least one processor to adjust a virtual resource value of the first virtual object to increase by a first change value, and a virtual resource value of the second virtual object to increase by a second change value at the interval of the preset time period.

18. The apparatus according to claim 10, wherein the program code comprises:
   assignment code configured to cause at least one of the at least one processor to assign, in a virtual character movement layer, a first movement range matching the first area to the first virtual character, and a second movement range matching the second area to the second virtual character, the first movement range and the second movement range being not overlapping with each other.

19. A non-transitory storage medium storing a program executable by at least one processor, the program comprising:
   displaying code configured to cause at least one of the at least one processor to display a user interface of an application, the user interface including a first area in which a first virtual character controlled by a first client and a first virtual object are displayed and a second area in which a second virtual character controlled by a second client and a second virtual object, the first area and the second area opposing each other and the first client and the second client being different from each other;
   receiving code configured to cause at least one of the at least one processor to receive an operation instruction based on a control operation on the first virtual character;
   execution code configured to cause at least one of the at least one processor to control, according to the operation instruction, the first virtual character to perform an interaction action on the first virtual object displayed in the first area; and
   adjustment code configured to cause at least one of the at least one processor to adjust a state of the first virtual object in the first area to a first target state based on the interaction action performed on the first virtual object and adjust, without an operation instruction from the second client, a state of the second virtual object displayed in the second area of the user interface to a second target state in response to the state of the first virtual object being changed based on the interaction action performed on the first virtual object.

20. An electronic device, comprising at least one memory, at least one processor, and a computer program stored in the at least one memory and executable by the at least one processor to perform the method according to claim 1.

* * * * *